(12) United States Patent
Omae et al.

(10) Patent No.: US 11,004,597 B2
(45) Date of Patent: May 11, 2021

(54) DETECTION APPARATUS, POWER SUPPLY SYSTEM, AND METHOD OF CONTROLLING DETECTION APPARATUS

(71) Applicant: Sony Corporation, Tokyo (JP)

(72) Inventors: Uichiro Omae, Kanagawa (JP); Tamotsu Kiyakawauchi, Aichi (JP)

(73) Assignee: Sony Corporation, Tokyo (JP)

( * ) Notice: Subject to any disclaimer, the term of this patent is extended or adjusted under 35 U.S.C. 154(b) by 663 days.

(21) Appl. No.: 15/847,023

(22) Filed: Dec. 19, 2017

(65) Prior Publication Data

US 2018/0108474 A1 Apr. 19, 2018

Related U.S. Application Data

(63) Continuation of application No. 14/259,358, filed on Apr. 23, 2014, now Pat. No. 9,892,848.

(30) Foreign Application Priority Data

May 16, 2013 (JP) .................................. 2013-103629

(51) Int. Cl.
*H01F 38/14* (2006.01)
*H02J 7/02* (2016.01)
(Continued)

(52) U.S. Cl.
CPC ............. *H01F 38/14* (2013.01); *G01V 3/101* (2013.01); *H02J 7/025* (2013.01); *H02J 50/12* (2016.02);
(Continued)

(58) Field of Classification Search
CPC . H01F 38/14; H02J 5/005; H02J 50/12; H02J 7/025
(Continued)

(56) References Cited

U.S. PATENT DOCUMENTS 5,734,254 A * 3/1998 Stephens ................. H02J 50/80
320/106
6,057,668 A * 5/2000 Chao ....................... H02J 7/025
320/108
(Continued)

FOREIGN PATENT DOCUMENTS

| JP | 2001-275280 | 10/2001 |
|---|---|---|
| JP | 2008-206231 | 9/2008 |

OTHER PUBLICATIONS

Chinese Office Action dated Nov. 6, 2017 for corresponding Chinese Application No. 201410196126.0.

*Primary Examiner* — Alfonso Perez Borroto
(74) *Attorney, Agent, or Firm* — Michael Best & Friedrich LLP

(57) ABSTRACT

A detection apparatus includes: a measurement coil disposed in a vicinity of a power reception coil configured to receive power supplied through a magnetic field; a measurement section configured to measure a voltage of the measurement coil as a measurement coil voltage; and a foreign object detection section configured to obtain an electrical characteristic value of at least one of the power reception coil and the measurement coil on the basis of the measurement coil voltage, and to detect a foreign object in the magnetic field if the electrical characteristic value is lower than a predetermined lower limit threshold value.

12 Claims, 16 Drawing Sheets

(51) Int. Cl.
*H02J 50/80* (2016.01)
*H02J 50/70* (2016.01)
*H02J 50/60* (2016.01)
*H02J 50/40* (2016.01)
*H02J 50/12* (2016.01)
*G01V 3/10* (2006.01)

(52) U.S. Cl.
CPC ............ *H02J 50/40* (2016.02); *H02J 50/60* (2016.02); *H02J 50/70* (2016.02); *H02J 50/80* (2016.02)

(58) Field of Classification Search
USPC .......................................................... 307/104
See application file for complete search history.

(56) References Cited

U.S. PATENT DOCUMENTS

| | | | |
|---|---|---|---|
| 6,118,249 A * | 9/2000 | Brockmann | H02J 7/025 320/108 |
| 7,554,316 B2 * | 6/2009 | Stevens | H02J 50/60 323/355 |
| 8,620,484 B2 * | 12/2013 | Baarman | H02J 50/60 700/291 |
| 8,855,554 B2 * | 10/2014 | Cook | H02J 50/12 455/41.1 |
| 2004/0145342 A1 * | 7/2004 | Lyon | H02J 50/90 320/108 |
| 2005/0068019 A1 * | 3/2005 | Nakamura | H02J 50/10 323/355 |
| 2013/0069441 A1 | 3/2013 | Verghese et al. | |
| 2013/0162054 A1 * | 6/2013 | Komiyama | G01R 21/006 307/149 |
| 2013/0162220 A1 * | 6/2013 | Iijima | H02J 50/80 320/137 |
| 2014/0015334 A1 | 1/2014 | Jung et al. | |

\* cited by examiner

FIG. 16
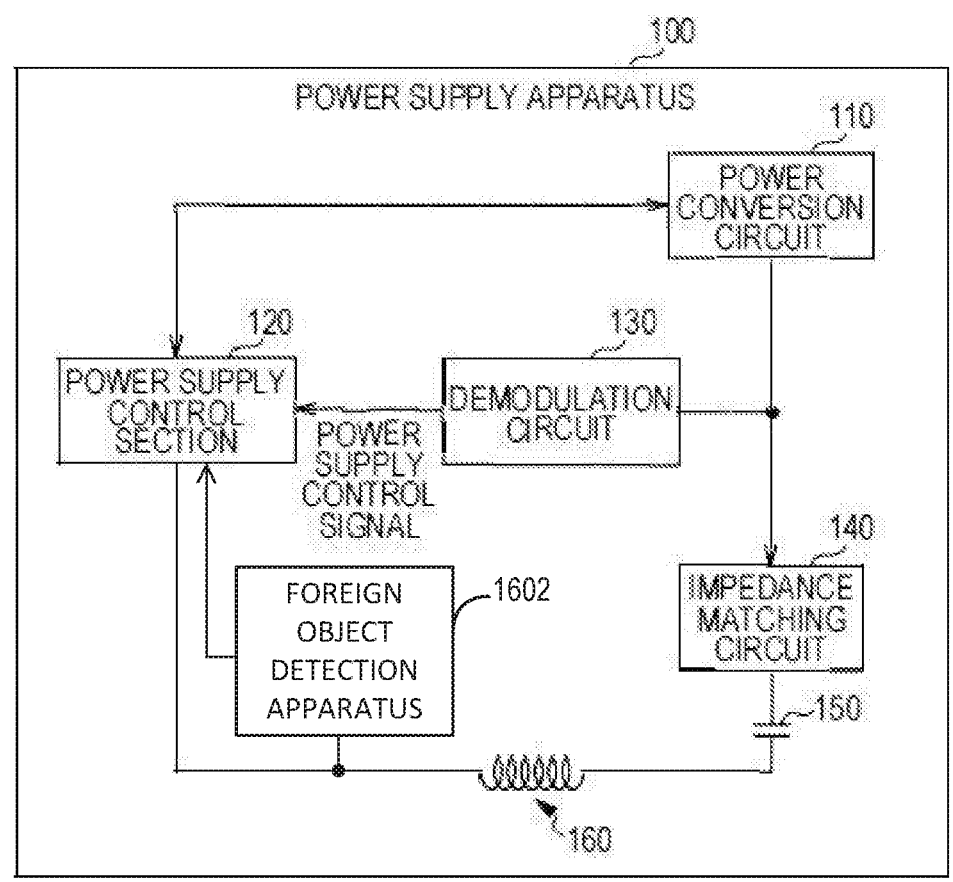
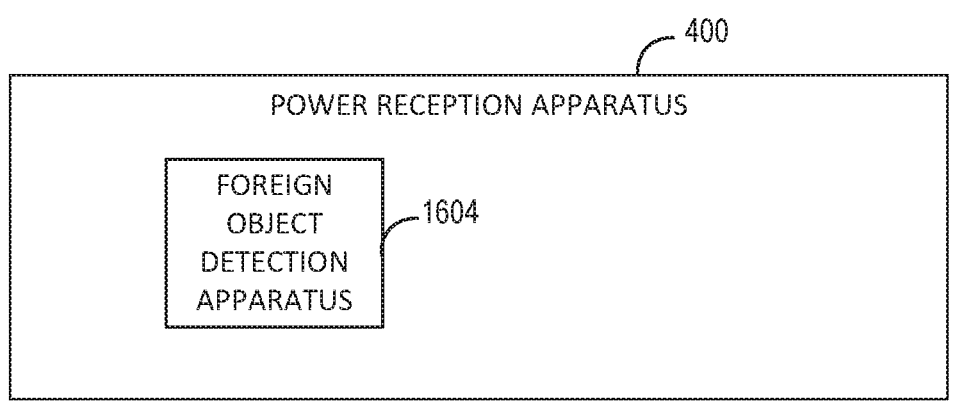

DETECTION APPARATUS, POWER SUPPLY SYSTEM, AND METHOD OF CONTROLLING DETECTION APPARATUS

CROSS REFERENCE TO RELATED APPLICATION

This present application is a Continuation of application Ser. No. 14/259,358, filed Apr. 23, 2014, which claims priority to Japanese Priority Patent Application JP 2013-103629 filed May 16, 2013, the entire contents of which are incorporated herein by reference.

BACKGROUND

The present disclosure relates to a detection apparatus, a power supply system, and a method of controlling a detection apparatus. More specifically, the present disclosure relates to a detection apparatus that detects a foreign object in a magnetic field, a power supply system, and a method of controlling a detection apparatus.

In recent years, public attention has been drawn to power supply systems in which power is supplied to CE (Consumer Electronics) devices, such as a mobile phone, a mobile music player, and the like in an electrically non-contact manner. These power supply systems are referred to as non-contact power supply systems, non-contact power transmission systems, wireless power supply systems, or the like. With these systems, it is possible to charge secondary devices by a simple method, for example placing a secondary device, such as an electronic device, or the like on a primary device, such as a power supply device, or the like. That is to say, a terminal connection becomes unnecessary between an electronic device and a power supply device.

As a method of performing non-contact power supply in this manner, an electromagnetic induction method has been familiar. Also, recently, a non-contact power supply system using a method called a magnetic field resonance method (or a magnetic resonance method) with the use of resonance phenomena has attracted attention.

A non-contact power supply system using the magnetic field resonance method has an advantage in that it is possible to perform power transmission on a principle of resonance phenomena between devices that are disposed more apart from each other than in the case of the electromagnetic induction method. Also, the non-contact power supply system using the magnetic field resonance method has an advantage in that even if axis alignment between a power supply coil of a power supply source and a power reception coil of a power supply destination is deteriorated in some degree, power transmission efficiency (that is to say, power supply efficiency) is not decreased so much.

However, both of the magnetic field resonance method and the electromagnetic induction method are non-contact power supply systems using magnetic coupling between the power supply coil of the power supply source and the power reception coil of the power supply destination.

Incidentally, one of important elements of a non-contact power supply system is a countermeasure against heat generation by a foreign object, such as metal, a magnetic body, a magnet, and the like that might generate heat through lines of magnetic force. In a non-contact power supply system using an electromagnetic induction method or a magnetic field resonance method, if a foreign object is put into a gap between a power supply coil and a power reception coil, the foreign object might generate heat by lines of magnetic force passing through the foreign object. This heat generation of the foreign object is caused by an eddy current loss generated in a metallic foreign object by the passage of lines of magnetic force through the metallic foreign object, a hysteresis loss generated in a foreign magnetic body, and the like by the passage of lines of magnetic force through a foreign magnetic body, a foreign magnet, or the like.

Heat generation by a foreign object might cause malfunction or damage of a power supply device and an electronic device, and the like. Accordingly, the prevention of heat generation by a foreign object is said to be a major task for a non-contact power supply system.

As a countermeasure against the heat generation, a method of adding a temperature sensor in order to detect heat generation by a foreign object is provided. However, in this method, a foreign object that has already generated heat is to be detected, and thus this method is difficult to become a fundamental countermeasure against heat generation by a foreign object. That is to say, it is desirable to provide a method of detecting a foreign object that might generate heat through lines of magnetic force before the foreign object actually generates much heat.

Thus, a proposal has been made of a method of checking changes in electrical parameters (a current, a voltage, and the like) when there is a metallic foreign object inserted between a power supply apparatus and a power reception apparatus, and determining the presence or absence of the metallic foreign object. By such a method, it is possible to detect existence of a foreign object before the foreign object generates much heat. Specifically, a proposal has been made of a method of detecting a metallic foreign object by changes in amplitude and phase at the time of communication between the power supply apparatus and the power reception apparatus (for example, refer to Japanese Unexamined Patent Application Publication No. 2008-206231). Also, a proposal has been made of a method of detecting a metallic foreign object by an eddy current loss (for example, refer to Japanese Unexamined Patent Application Publication No. 2001-275280).

SUMMARY

However, in the related-art technique described above, it is difficult to correctly detect a foreign object. In the above-described systems, no consideration has been given to the influence on a metallic housing of a power reception apparatus. In the case of charging a common electronic device, it is highly possible that a metal of some kind (a metallic housing, a metallic part, or the like) is used for an electronic device. Accordingly, it is difficult to determine whether a change in a parameter is caused by "influence by a metallic housing, or the like", or by "unexpected existence of a metallic foreign object". For example, in the case of detecting a foreign object by a change of an eddy current loss, it is difficult to determine whether an eddy current loss is generated by a metallic housing of an electronic device, or by the unexpected existence of a metallic foreign object between a power supply apparatus and a power reception apparatus. This is the same for the case of detecting a foreign object by a change in amplitude and phase.

The present technique has been made in view of these circumstances, and it is desirable to correctly detect a foreign object in a magnetic field.

The present technique has been made in order to address the above-described problems. According to an embodiment of the present disclosure, there is provided a detection apparatus including: a measurement coil disposed in a vicinity of a power reception coil configured to receive power supplied through a magnetic field; a measurement section configured to measure a voltage of the measurement coil as a measurement coil voltage; and a foreign object detection section configured to obtain an electrical characteristic value of at least one of the power reception coil and the measurement coil on the basis of the measurement coil voltage, and to detect a foreign object in the magnetic field if the electrical characteristic value is lower than a predetermined lower limit threshold value, and a method of controlling the detection apparatus. Thereby, if the electrical characteristic value is lower than a predetermined lower limit value, the working effect of detection of a foreign object is brought about.

Also, in the above-described embodiment, if the electrical characteristic value is lower than the lower limit threshold value, or if the electrical characteristic value is higher than an upper limit threshold value greater than the lower limit threshold value, the foreign object detection section may be configured to detect the foreign object. Thereby, if the electrical characteristic value is lower than the lower limit threshold value, or if the electrical characteristic value is higher than an upper limit threshold value greater than the lower limit threshold value, the working effect of detection of a foreign object is brought about.

Also, in the above-described embodiment, the upper limit threshold value may be higher than a reference value being the electrical characteristic value when there is no foreign object, and the lower limit threshold value may be a lower value than the reference value. Thereby, if the electrical characteristic value is lower than a lower limit value less than the reference value, the working effect of detection of a foreign object is brought about.

Also, in the above-described embodiment, the measurement section may be configured to further measure a voltage and a current of the power reception coil, and the foreign object detection section may be configured to obtain impedance of the power reception coil from the measurement coil voltage, and the voltage and the current of the power reception coil as the electrical characteristic value. Thereby, the working effect of obtaining impedance of the power reception coil as the electrical characteristic value is brought about.

Also, in the above-described embodiment, the measurement section may be configured to further measure a voltage of the power reception coil as a power reception coil voltage, and the foreign object detection section may be configured to obtain a voltage ratio of the measurement coil voltage and the power reception coil voltage as the electrical characteristic value. Thereby, the working effect of obtaining the voltage ratio as the electrical characteristic value is brought about.

Also, in the above-described embodiment, the measurement section may be configured to further measure a voltage of the power reception coil as a power reception coil voltage, the power reception coil may be configured to receive first and second power having a different amount of power with each other in sequence, and the foreign object detection section may be configured to obtain, as the electrical characteristic, a difference between the voltage ratio obtained when the first power is received, and the voltage ratio obtained when the second power is received. Thereby, the working effect of obtaining the difference between the voltage ratios as the electrical characteristic value is brought about.

Also, in the above-described embodiment, the measurement coil may be configured to have a smaller coil surface area than that of the power reception coil. Thereby, the working effect of measuring the voltage of the measurement coil smaller than that of the power reception coil is brought about.

Also, in the above-described embodiment, the measurement coil may be disposed inside the power reception coil. Thereby, the working effect of measuring the voltage of the measurement coil disposed inside the power reception coil is brought about.

Also, in the above-described embodiment, the measurement coil may be disposed on a substantially same plane as that of the power reception coil. Thereby, the working effect of measuring the voltage of the measurement coil disposed on a substantially same plane as that of the power reception coil is brought about.

Also, in the above-described embodiment, the measurement coil may be disposed at a position where a coil surface of the measurement coil and that of the power reception coil have a substantially same center position. Thereby, the working effect of measuring the voltage of the measurement coil disposed at a position where a coil surface of the measurement coil and that of the power reception coil have a substantially same center position is brought about.

Also, in the above-described embodiment, the power may be power supplied from a power supply apparatus, and the detection apparatus may further include a transmission section configured to transmit a control signal requesting a decrease in an amount of the power if the foreign object is detected. Thereby, the working effect of transmitting a control signal requesting a decrease in the amount of the power if the foreign object is detected is brought about.

According to another embodiment of the present disclosure, there is provided a detection apparatus including: a measurement coil disposed in a vicinity of a power supply coil configured to supply power through a magnetic field; a measurement section configured to measure a voltage of the measurement coil as a measurement coil voltage; and a foreign object detection section configured to obtain an electrical characteristic value of at least one of the power reception coil and the measurement coil on the basis of the measurement coil voltage, and to detect a foreign object in the magnetic field if the electrical characteristic value is lower than a predetermined lower limit threshold value. Thereby, if the electrical characteristic value is lower than a predetermined lower limit value, the working effect of detection of a foreign object is brought about.

According to another embodiment of the present disclosure, there is provided a power supply system including: a power supply coil configured to supply power through a magnetic field; a power reception coil configured to receive the power; a measurement coil disposed in a vicinity of the power reception coil; a measurement section configured to measure a voltage of the measurement coil as a measurement coil voltage; and a foreign object detection section configured to obtain an electrical characteristic value of at least one of the power reception coil and the measurement coil on the basis of the measurement coil voltage, and to detect a foreign object in the magnetic field if the electrical characteristic value is lower than a predetermined lower limit threshold value. Thereby, the working effect of detection of a foreign object on the basis of the measurement coil voltage is brought about.

By the present technique, it is possible to obtain an advantage of correctly detecting a foreign object in a magnetic field.

BRIEF DESCRIPTION OF THE DRAWINGS

FIG. 16 is a block diagram illustrating an example of a first foreign object detection apparatus disposed inside of a power supply apparatus and a second foreign object detection apparatus disposed inside of a power reception apparatus according to the first embodiment.

DETAILED DESCRIPTION OF EMBODIMENTS

In the following, descriptions will be given of modes for carrying out the present technique (hereinafter referred to as embodiments). The descriptions will be given in the following order.

1. First embodiment (example of detecting a foreign object on the basis of impedance)
2. Second embodiment (example of detecting a foreign object on the basis of AK)
3. Third embodiment (example of detecting a foreign object on the basis of voltage ratio)
4. Fourth embodiment (example of detecting a foreign object on the basis of detection coil voltage)
5. Variations

1. First Embodiment

Example of Configuration of Non-Contact Power Supply System

Figure 1:
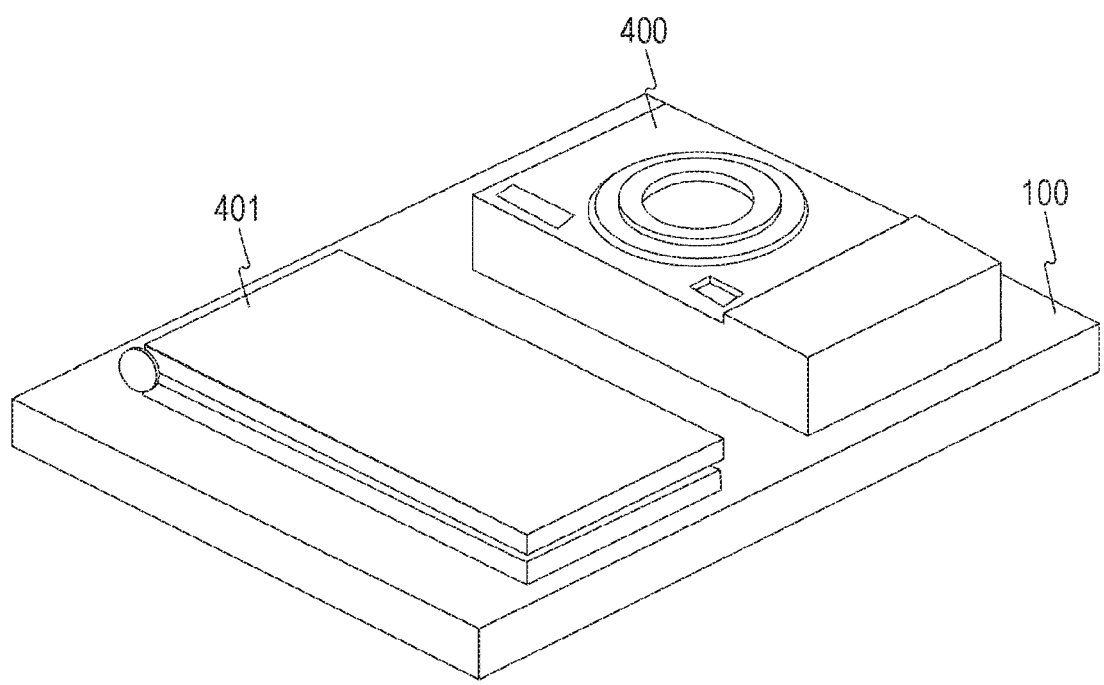
FIG. 1 is a perspective view illustrating an example of a configuration of a non-contact power supply system according to a first embodiment.

FIG. 1 is a perspective view illustrating an example of a configuration of a non-contact power supply system according to a first embodiment. The non-contact power supply system is a system for supplying power in an electrically non-contact manner through a magnetic field. The non-contact power supply system includes a power supply apparatus 100, and power reception apparatuses 400 and 401. In this regard, the number of the power reception apparatuses is not limited to two, and may be one, three or more.

The power supply apparatus 100 supplies power to the power reception apparatuses 400 and 401 in an electrically non-contact manner. By non-contact power supply, a user is allowed to charge the power reception apparatuses 400 and 401 by easy operation, such as placing the power reception apparatuses 400 and 401 on the power supply apparatus 100, or the like without making a terminal connection to an AC (Alternating Current) adapter, or the like. Such a charging method reduces workload of the user.

The power supply apparatus 100 is formed in a planar shape having a certain area, for example. Specifically, the power supply apparatus 100 is formed in the shape of a shallow box (a so-called tray state), in the shape of a mat (a so-called mat state), or in a shape having a slight height with a flat upper part (a so-called table state). The lower part or the surface of the plane (hereinafter, referred to as a "power supply face".) is provided with a power supply coil that generates a magnetic field.

It is desirable that the surface of the power supply face is sufficiently larger than the areas of the power reception faces of the power reception apparatuses so that a plurality of the power reception apparatuses, such as the power reception apparatuses 400 and 401, and the like are allowed to be placed on the surface. Here, the power reception face is a plane including a lower part or a surface on which a power reception coil that receives power supplied through a magnetic field is disposed. By placing a plurality of power reception apparatuses on the power supply face, it is possible for the non-contact power supply system to charge these apparatuses at the same time or in sequence.

In this regard, a configuration in which the area of the power supply face is larger than the area of the power reception face is employed. However, the configuration is not limited to this configuration. The areas may be nearly equal, or the area of the power supply face may be smaller than that of the power reception face. Also, it is possible to charge the power reception apparatus 400, and the like only by being brought close, and thus the shape of the power supply apparatus 100 is not limited to a shape having a plane. For example, the power supply apparatus 100 may be desk-top shape, such as a desk holder, a cradle, and the like.

Also, the power supply apparatus 100 has a configuration for only charging. However, together with charging, the power supply apparatus 100 may perform bi-directional data transfer with the power reception apparatus 400.

The power reception apparatus 400 receives power supplied from the power supply apparatus 100 through a magnetic field. For example, electronic devices, such as a mobile telephone terminal, an electronic still camera, and the like are used as the power reception apparatus 400. The power reception apparatus 400 detects the presence or absence of a foreign object in a magnetic field. And if a foreign object is detected, the power reception apparatus 400 requests the power supply apparatus 100 to decrease the amount of power supply. The power supply apparatus 100 decreases the amount of power supply in response to the request. Thereby, heat generation of the foreign object is prevented. The power reception apparatus 401 has the same configuration as that of the power reception apparatus 400.

In this regard, the power reception apparatus 400 may be equipment other than an electronic device, such as an electric vehicle, and the like. In the case of an electric vehicle, the power reception apparatus 400 is allowed to detect a metallic foreign object attached to the vehicle body together with mud, and so on, for example.

Example of Configuration of Power Supply Apparatus

Figure 2:
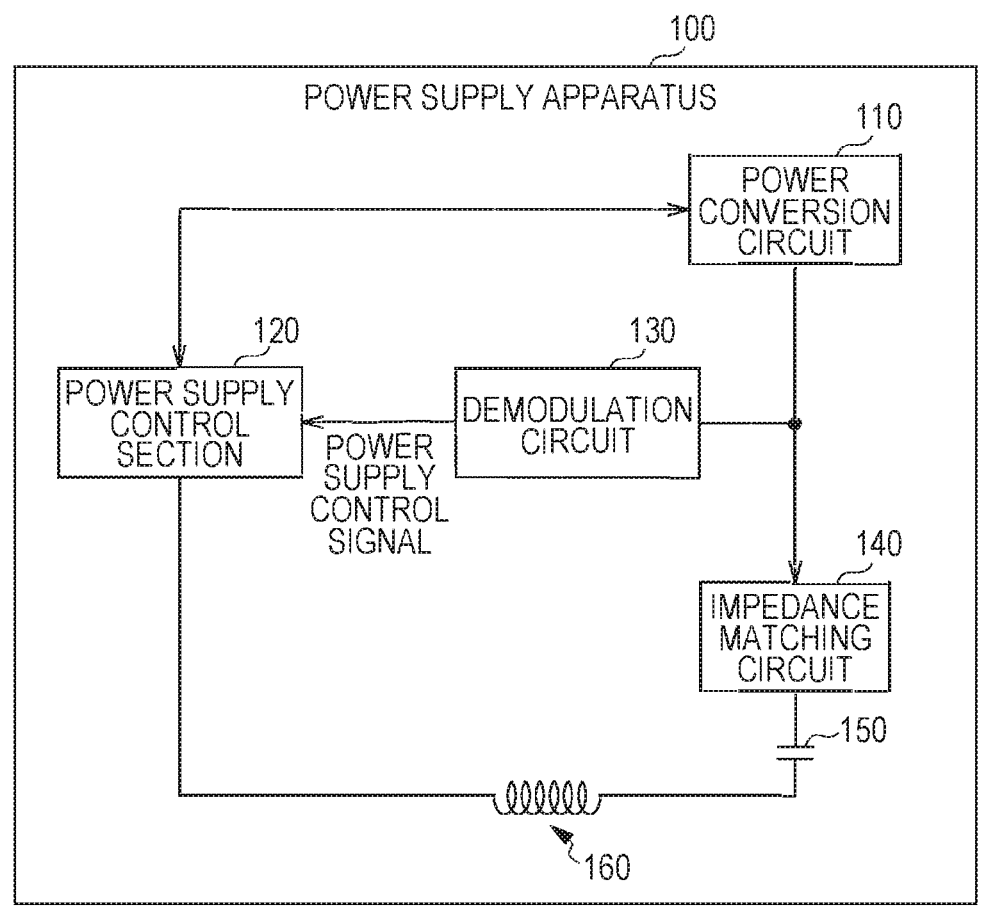
FIG. 2 is a block diagram illustrating an example of a configuration of a power supply apparatus according to the first embodiment.

FIG. 2 is a block diagram illustrating an example of a configuration of the power supply apparatus 100 according to the first embodiment. The power supply apparatus 100 includes a power conversion circuit 110, a power supply control section 120, a demodulation circuit 130, an impedance matching circuit 140, a capacitor 150, and a power supply coil 160.

The power conversion circuit 110 is a circuit that converts the voltage and the frequency of the power supplied from an external power supply source of the power supply apparatus 100, and generates AC power for performing power transmission. Also, when the power supply control section 120 instructs to change the frequency, the power conversion circuit 110 changes the frequency of the generated AC power. Here, the external power supply source is a commercial power source to be supplied through a plug socket (a so-called outlet), for example.

The power supply control section 120 controls the amount of power supplied to the power reception apparatus 400. When the power source of the power supply apparatus 100 is turned on, the power supply control section 120 controls the power conversion circuit 110 to start supplying a predetermined amount of power W1 to the power reception apparatus 400. Here, the amount of power W1 is set to a minimum amount of power that allows the power reception apparatus 400 to operate, for example.

And the power supply control section 120 receives a power supply control signal for controlling the amount of power supply from the power reception apparatus 400 through the demodulation circuit 130. The power supply control section 120 controls the amount of power supply in accordance with the power supply control signal. The power supply control signal includes a signal for requesting an increase in the amount of power supply and a signal for requesting a decrease in the amount of power supply, for example.

If an increase in the amount of power supply is requested, the power supply control section 120 controls the power conversion circuit 110 to cause the power reception apparatus 400 to supply the amount of power W2 that is higher than the amount of power W1. Here, the amount of power W2 is set to the amount of power that is sufficient for the power reception apparatus 400 to charge a secondary battery, and the like.

And when the amount of power is W2, if a decrease in the amount of power supply is requested, the power supply control section 120 controls the power conversion circuit 110 to return the amount of power to W1. In this regard, the power supply control section 120 controls the amount of power in the two stages W1 and W2. However, the power supply control section 120 may perform three-stage control, or may control the start and the stop of power supply.

The control of the amount of power supply is performed by the power supply control section 120 exerting control on the power conversion circuit 110 so as to change the AC frequency, for example. Specifically, if the power supply control section 120 increases the amount of power supply, the power supply control section 120 matches the AC frequency with a specific frequency (for example, a resonance frequency). If the power supply control section 120 decreases the amount of power supply, the power supply control section 120 performs control so that the AC frequency becomes a different value from the specific frequency.

In this regard, the control of the amount of power supply is not limited to changing the AC frequency. For example, the power supply control section 120 may cause the power conversion circuit 110 to increase or decrease the AC voltage so as to control the amount of power supply. Also, in the case of a configuration in which the power conversion circuit 110 generates a pulse signal by a switching power source, or the like to supply the pulse signal to the power supply coil 160, the power supply control section 120 may control the amount of power supply by changing the duty ratio of the pulse signal.

The demodulation circuit 130 demodulates an AC signal from the power reception apparatus 400, and extracts a power supply control signal superposed on the AC signal. The demodulation circuit 130 supplies the power supply control signal to the power supply control section 120.

The impedance matching circuit 140 is a circuit that controls the impedance of the power-supply side circuit to obtain impedance matching with the impedance of the power-reception side circuit. By carrying out impedance matching, the power transmission efficiency is improved. In this regard, if the transmission efficiency is sufficiently high, or the transmission efficiency is sufficiently improved only by the impedance matching at the power reception side, and the like, a configuration of not disposing the impedance matching circuit 140 may be employed.

The capacitor 150 is an element that stores or discharges electric energy. The capacitor 150 is connected to the power supply coil 160 in series, for example, and constitutes an LC resonance circuit together with the power supply coil 160. The capacitance value of the capacitor 150 is set such that the resonance frequency f1 of the LC resonance circuit substantially matches the resonance frequency f2 of the LC resonance circuit of the power reception side, or becomes a frequency in the vicinity of the resonance frequency f2.

In this regard, if the resonance frequency f1 is obtained by a line capacitance of the power supply coil 160, or a parasitic capacitance component formed by the capacitance between the power supply coil 160 and the power reception coil described later, and the like, the capacitor 150 may not be disposed. Also, in the case where the power transmission efficiency is sufficiently high, or the like, the capacitor 150 may not be disposed.

Also, the capacitor 150 may be a variable capacitor. In that case, the power supply control section 120 controls the capacitance in order to adjust the resonance frequency.

When AC power is supplied from the power conversion circuit 110, the power supply coil 160 generates an electromagnetic wave in accordance with the Ampere's law. Electric power is supplied to the power reception apparatus 400 through this electromagnetic wave.

In this regard, the power supply apparatus 100 has a configuration including only one power supply coil 160. However, the power supply apparatus 100 may have a configuration including a plurality of power supply coils 160.

Example of Configuration of Power Reception Apparatus

Figure 3:
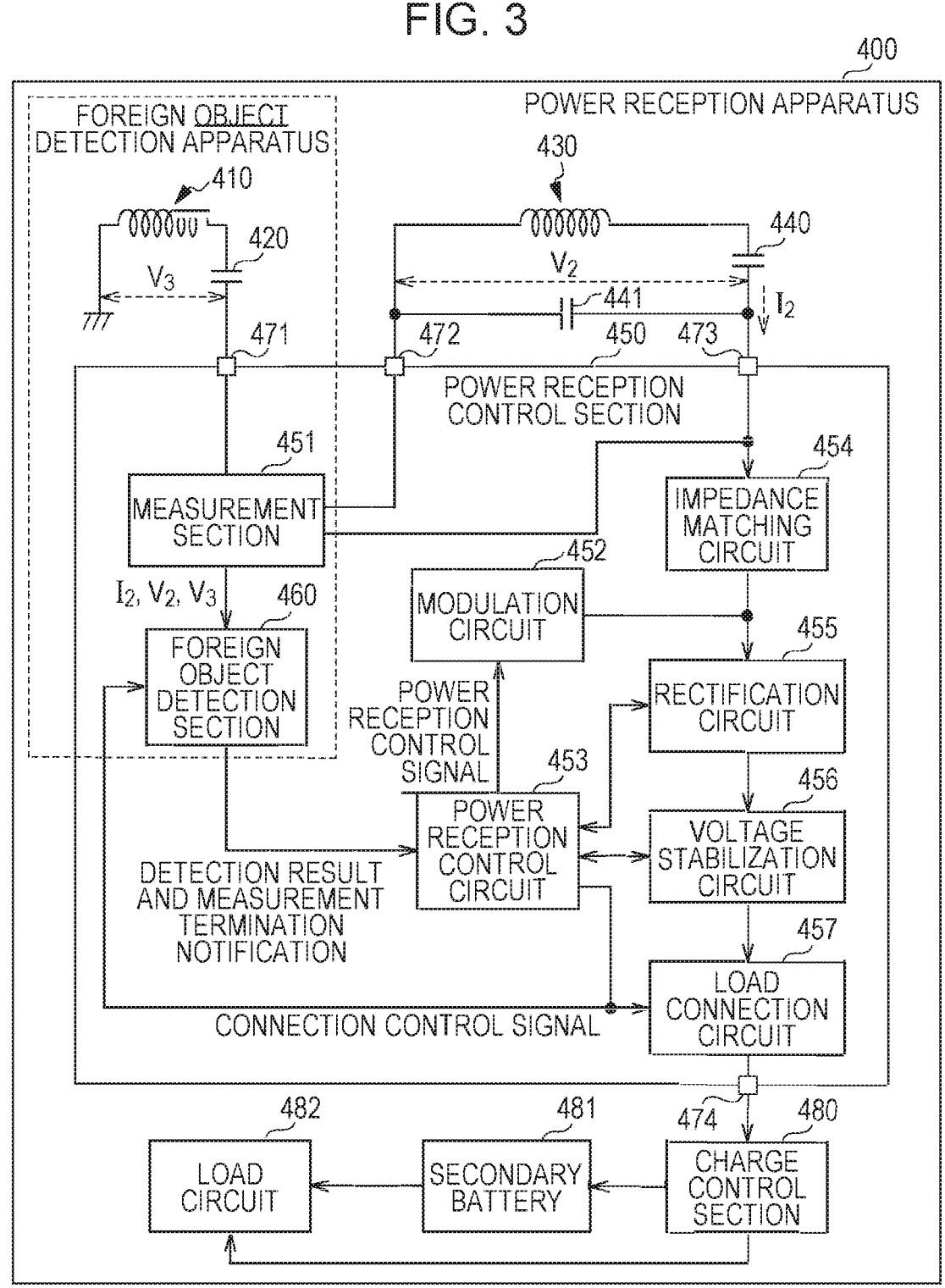
FIG. 3 is a block diagram illustrating an example of a configuration of a power reception apparatus according to the first embodiment.

FIG. 3 is a block diagram illustrating an example of a configuration of the power reception apparatus 400 according to the first embodiment. The power reception apparatus 400 includes a detection coil 410, a capacitor 420, a power reception coil 430, capacitors 440 and 441, and a power reception control section 450. Also, the power reception apparatus 400 includes a charge control section 480, a secondary battery 481, and a load circuit 482.

The detection coil 410 is a coil disposed in the vicinity of the power reception coil 430, and is used for measuring a voltage in order to detect a foreign object. In this regard, the detection coil 410 is an example of a measurement coil described in the claims.

The capacitor 420 is an element that stores or discharges electric energy. The capacitor 420 is connected to the detection coil 410 in series, for example. The capacitor 420 is used for a resonance purpose, a filter purpose, a coupling purpose, and the like. In particular, in the case of a resonance purpose, the capacitor 420 constitutes an LC resonance circuit together with the detection coil 410. And the capacitance value of the capacitor 420 is set such that the LC resonance circuit has a resonance frequency of f3. Also, in the case of reducing electromagnetic interference caused by the power supply side, it is desirable to set the resonance frequency f3 not to match the resonance frequency f1 of the power supply side. On the contrary, in the case of positively using electromagnetic interference caused by the power supply side, the resonance frequency f3 is sometimes set to match the resonance frequency f1 of the power supply side. Of course, in situations where a resonance purpose, a filter purpose, a coupling purpose, and the like are not necessary, it is not necessary to dispose the capacitor 420.

The power reception coil 430 receives power supplied from the power supply apparatus 100. Specifically, when an electromagnetic wave is supplied from the power supply apparatus 100, the power reception coil 430 generates an induction voltage in response to a change in the magnetic flux of the electromagnetic wave in accordance with the law of electromagnetic induction.

In this regard, the power reception apparatus 400 has a configuration including only one power reception coil 430. However, the power reception coil 430 may have a configuration including a plurality of power reception coils 430. Also, in the case where the power reception coil 430 includes a plurality of power reception coils 430, the detection coil 410 is disposed in the vicinity of at least one of the power reception coils 430.

The capacitors 440 and 441 are elements that store or discharge electric energy. The capacitor 440 is connected to the power reception coil 430 in series, and the capacitor 441 is connected in parallel with the power reception coil 430. The capacitors 440 and 441 constitute an LC resonance circuit together with the power reception coil 430. The capacitance values of the capacitor 440, and so on are set such that the resonance frequency f2 of the LC resonance circuit substantially matches the resonance frequency f1 of the power supply side, or becomes a frequency in the vicinity of the resonance frequency f1.

In this regard, at least one of the capacitors 420 and 440 may be a variable capacitor. In that case, the power reception control section 450 controls the capacitance of the variable capacitor in order to adjust the resonance frequency. On the other hand, if the resonance frequency f2 is obtained by a line capacitance of the power reception coil 430, or a parasitic capacitance component formed by the capacitance between the power supply coil 160 and the power reception coil 430, and so on, the capacitor 420 and the capacitor 440 may not be disposed. Also, in the case where power transmission efficiency is sufficiently high, or the like, the capacitor 420 and the capacitor 440 may not be disposed.

Also, the power reception apparatus 400 may further include a resonance circuit in addition to the resonance circuit including the detection coil 410, and the resonance circuit including the power reception coil 430.

The power reception control section 450 performs overall control of the power reception apparatus 400. The power reception control section 450 includes a measurement section 451, a foreign object detection section 460, a modulation circuit 452, a power reception control circuit 453, an impedance matching circuit 454, a rectification circuit 455, a voltage stabilization circuit 456, and a load connection circuit 457.

Also, the power reception control section 450 includes terminals 471, 472, 473 and 474. One end of the detection coil 410 is connected to the terminal 471 through the capacitor 420. The LC resonance circuit including the power reception coil 430 is connected to terminals 472 and 473. The charge control section 480 is connected to the terminal 474.

The measurement section 451 measures a voltage $V_2$ and a current $I_2$ of the power reception coil 430, and a voltage $V_3$ of the detection coil 410. The voltage is measured by a voltage transformer, and so on. A shunt resistor is connected to the power reception coil in series, and the current is obtained from the potential difference of the both ends, for example. In the measuring, volt (V) is used as a unit of voltage, for example, and ampere (A) is used as a unit of current, for example.

In this regard, the current may be obtained by a current transformer. Also, the measurement section 451 may include an amplification circuit that amplifies the AC signal, and the voltage amplified by the amplification circuit, and so on may be measured. By the amplification of the AC signal, it is possible for the measurement section 451 to measure the voltage, and the like with high precision.

Hereinafter the voltage $V_2$ of the power reception coil 430 is referred to as a "power reception coil voltage", and hereinafter, the current $I_2$ of the power reception coil 430 is referred to as a "power reception coil current". Also, hereinafter the voltage $V_3$ of the detection coil is referred to as a "detection coil voltage". The measurement section 451 supplies the measurement values to the foreign object detection section 460.

Here, it is assumed that the power reception coil voltage and the power reception coil current that are to be measured are the voltage and the current before having been rectified by the rectification circuit 455. In this regard, a configuration in which the measurement section 451 measures the reception power coil voltage and the power reception coil current after the rectification may be employed.

The foreign object detection section 460 detects a foreign object in a magnetic field from the power supply apparatus 100 on the basis of the measurement value measured by the measurement section 451. The foreign object detection section 460 determines whether a load is connected or not on the basis of the connection control signal from the power reception control section 450. And the foreign object detection section 460 obtains measurement values of when a load is connected and when a load is not connected, and detects a foreign object on the basis of the measurement values. A detailed description will be given of the detection method later. The foreign object detection section 460 supplies a detection result of a foreign object to the power reception control section 450.

In this regard, an apparatus including a detection coil 410, a measurement section 451, and a foreign object detection section 460 is an example of a foreign object detection apparatus described in the claims. Also, a configuration of including the foreign object detection apparatus in the power reception apparatus 400 is employed. However, a configuration of disposing the foreign object detection apparatus outside the power reception apparatus 400 may be employed.

The modulation circuit 452 modulates the amplitude of the AC signal, and so on to the power supply apparatus 100 so as to superimpose the power supply control signal. When the modulation circuit 452 receives the power supply control signal from the power reception control circuit 453, the modulation circuit 452 superimposes the power supply control signal on the AC signal. Thereby, the power supply control signal is transmitted to the power supply apparatus 100.

In this regard, the modulation circuit 452 performs load modulation, but may perform modulation by a modulation method other than the load modulation. Also, the power reception apparatus 400 transmits the power supply control signal by load modulation, but may perform transmission by the other methods. For example, the power reception apparatus 400 may further include a communication coil, and an antenna, and may transmit the power supply control signal using the communication coil, and the antenna.

The power reception control circuit 453 controls the amount of power supply on the basis of a foreign object detection result. When an electric power of W1 is supplied from the power supply apparatus 100, the power reception control circuit 453 supplies a connection control signal instructing disconnection of a load to the load connection circuit 457.

And when receiving a measurement termination notification from the foreign object detection section 460, the power reception control circuit 453 supplies a connection control signal instructing connection of a load to the load connection circuit 457, and supplies a power supply control signal requesting an increase in the amount of power supply to the modulation circuit 452. Thereby, the amount of power supply is increased from W1 to W2.

After an electric power of W2 is supplied, when a detection result indicating detection of a foreign object is received, the power reception control circuit 453 supplies a connection control signal instructing disconnection of a load to the load connection circuit 457, and supplies the power supply control signal requesting a decrease in the amount of power supply to the modulation circuit 452. Thereby, the amount of power supply is decreased from W2 to W1, and thus heat generation of a foreign object is restrained.

In this regard, the power reception control circuit 453 requests to return the amount of power supply to the initial W1 at foreign object detection time. However, the power reception control circuit 453 may request to decrease the amount of power supply to lower than W1 at foreign object detection time. Also, the power reception control circuit 453 may request the amount of power supply that is lower than W2, but higher than W1 at foreign object detection time. Alternatively, the power reception control circuit 453 may requests to stop power supply at foreign object detection time. Or, the power reception control circuit 453 may instruct only disconnection of a load at foreign object detection time, and does not request to decrease the amount of power supply. In the case of not requesting to decrease the amount of power supply, it is not necessary to dispose the modulation circuit 452. Also, the power reception control circuit 453 disconnects a load at foreign object detection time. However, the power reception control circuit 453 may request to decrease the amount of power supply while connecting a load at foreign object detection time.

Also, the power reception control circuit 453 transmits only the power supply control signal. However, the power reception control circuit 453 may further transmit a detection result of a foreign object separately from the power supply control signal. In this case, the power supply apparatus 100 ought to decrease the amount of power supply at foreign object detection time.

Also, the power reception control circuit 453 controls the rectification circuit 455 and the voltage stabilization circuit 456. For example, when the amount of power W2 is supplied, the power reception control circuit 453 operates the rectification circuit 455 and the voltage stabilization circuit 456. And if a foreign object is detected, the power reception control circuit 453 stops the rectification circuit 455 and the voltage stabilization circuit 456.

The impedance matching circuit 454 is a circuit that controls the impedance of the power reception circuit to obtain impedance matching of the power-supply side circuit. By obtaining impedance matching, the power transmission efficiency is improved. In this regard, in the case where the transmission efficiency is sufficiently high, or in the case where the transmission efficiency is sufficiently improved by only the impedance matching of the power supply apparatus, and the like, the impedance matching circuit 454 may not be disposed.

The rectification circuit 455 rectifies the AC power supplied from the power supply apparatus 100 to generate a direct current power. The rectification circuit 455 supplies the generated direct current power to the charge control section 480 through the voltage stabilization circuit 456 and the load connection circuit 457. The voltage stabilization circuit 456 performs control in order to keep the voltage of the direct current power constant.

In this regard, the power after the rectification by the rectification circuit 455 is directly supplied to the voltage stabilization circuit 456. However, the configuration is not limited to this. For example, a configuration of disposing a smoothing circuit for smoothing the power after the rectification between the rectification circuit 455 and the voltage stabilization circuit 456 may be employed.

The load connection circuit 457 performs control so that the apparatus goes either to a load connected state or a load disconnected state under the control of the power reception control circuit 453. Specifically, if instructed to disconnect a load, the load connection circuit 457 opens the circuit between the rectification circuit 455 and the charge control section 480 in order to stop supplying direct current power. On the other hand, if instructed to connect a load, the load connection circuit 457 closes the circuit between the rectification circuit 455 and the charge control section 480.

The charge control section 480 controls the voltage and the current of the direct current power in order to charge the secondary battery 481. Also, the charge control section 480 supplies part of the charging power to the load circuit 482 while charging the secondary battery 481. The secondary battery 481 stores the power charged by the charge control section 480. For example, a lithium ion battery, or the like is used as the secondary battery 481. The load circuit 482 is a circuit that operates using power from the secondary battery 481 or the charge control section 480.

In this regard, the charge control section 480 is disposed outside the power reception control section 450. However, the charge control section 480 may be included in the power reception control section 450. Thereby, the power reception control section 450 effectively restrict or stop supplying power to the secondary battery 481 and the load circuit 482. In that case, the charge control section 480 may be included in the power reception control circuit 453. On the other hand, the charge control section 480 may be allowed to control at least part of the power reception control section 450 while disposing the charge control section 480 outside the power reception control section 450.

Also, the foreign object detection apparatus is disposed at the power reception side. However, the foreign object detection apparatus may be disposed at the power supply side in place of the power reception side. In this case, the detection coil 410 is disposed in the vicinity of the power supply coil 160, and the foreign object detection section 460 detects a foreign object in a magnetic field generated by the power supply coil 160. Also, the foreign object detection apparatus is disposed inside or outside the power supply apparatus 100. Also, the foreign object detection apparatus may be disposed on both the power supply side and the power reception side.

Also, the power supply apparatus 100, and the power reception apparatus 400 may further include a circuit, and the like in addition to the configuration exemplified in FIG. 2 and FIG. 3. For example, at least one of the power supply apparatus 100, and the power reception apparatus 400 may further include a display section for displaying a foreign object detection result, and the like, a communication section for performing bi-directional communication, a detection section for detecting whether the power reception apparatus 400 has been placed on the power supply apparatus 100, and the like.

Figure 4A:
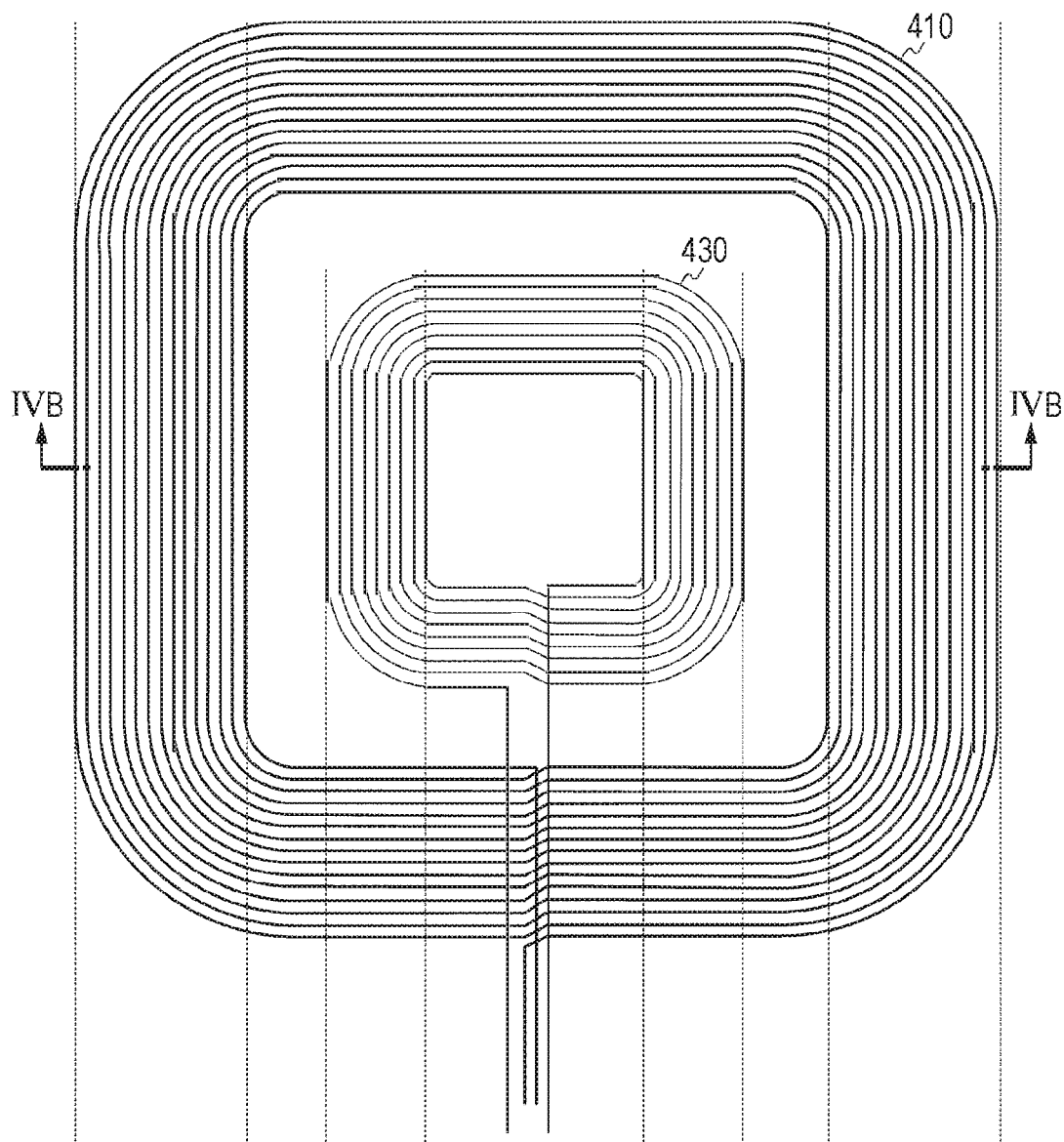
FIGS. 4A and 4B are diagrams illustrating an example of a power reception coil and a detection coil according to the first embodiment.
Figure 4B:

FIGS. 4A and 4B are diagrams illustrating an example of the power reception coil 430 and the detection coil 410 according to the first embodiment. FIG. 4A is an example of a plan view of the power reception coil 430, and the detection coil 410.

The area of the coil face of the detection coil 410 is smaller than that of the power reception coil 430. Also, the detection coil 410 is disposed inside the power reception coil 430. Also, it is desirable for the detection coil 410 to be disposed such that the center thereof substantially matches the center of the power reception coil 430.

FIG. 4B is an example of sectional views taken along line IVB-IVB of the power reception coil 430, and the detection coil 410 of FIG. 4A. As illustrated in FIG. 4B, in order to make the apparatus thin, and from the viewpoint of implementation and mass production, it is desirable to dispose the detection coil 410, and the power reception coil 430 on the substantially same plane.

In this regard, in FIG. 4B, the detection coil 410, and the power reception coil 430 are disposed substantially on the same plane, but may be disposed on different planes.

The power reception coil 430, the detection coil 410, and the power supply coil 160 are formed by winding a conductive wire, for example, and the winding number is any. In this regard, these coils may be formed by any way other than winding a conductive wire. For example, these coils may be formed by a conductive pattern, such as a printed circuit board, a flexible printed circuit board, and the like. These coils are referred to as pattern coils or pattern loops. It is also possible to form a pattern coil by printing or depositing a conductive material on a substrate, or fabricating a conductive metal plate or sheet, and the like.

Also, these coils may be formed by winding a wire produced by bundling a plurality of conductive strands. Specifically, these coils are formed by winding a wire produced by bundling two conductive strands, a wire produced by bundling three conductive strands, and the like. The former is called a bifilar wound coil, and the latter is called a trifilar wound coil. Also, the wound wire of each coil may be a wire produced by twisting a plurality of conductive strands (that is to say, a litz wire).

Also, for these coils, a spiral shaped coil or a helical shaped coil in which a wire is wound in a thickness direction may be used. Also, each coil may be formed in an α-winding shape in which a spiral shaped coil is folded back by two layers, in a more multi-layered spiral shape, and so on.

Also, in order to prevent magnetic flux leakage, and to improve transmission efficiency, a shield made of a magnetic body, a magnet, an electric conductor, metal, or the like may be disposed.

Also, the detection coil 410 may be disposed inside the part where the wire of the power reception coil 430 is wound (that is to say, a track). Further, a coil for use other than non-contact power supply, such as an induction heating coil, a wireless communication coil, and the like may be used for the detection coil 410 in combination. In addition, the power reception coil 430 and the detection coil 410 may be used in combination depending on the configuration of the non-contact power supply system. In this regard, in addition to the cases of using the same coil in combination, it is assumed that there are cases where a part of a coil is used in combination using switching, and the like.

If there is a conductive foreign object, such as a metal, or the like in a magnetic field formed by the power supply apparatus 100, an eddy current occurs in the foreign object by magnetic induction effect. The foreign object is heated by the Joule heat caused by the eddy current. Also, the magnetic field generated by the eddy current works on the detection coil 410 and the power reception coil 430, and changes the electric characteristic, such as the impedance of the equivalent circuit thereof, or the like.

In particular, if there is a foreign object in the vicinity of the wire of the power reception coil 430, the magnetic field generated by the foreign object disperses the magnetic field in the vicinity of the wire, and thus the impedance of the equivalent circuit of the power reception coil 430 increases. On the other hand, if there is a foreign object near the center of the power reception coil 430, by a similar principle of inserting an iron core in the center of the power reception coil 430, the magnetic field concentrates near the center, and thus the impedance of the power reception coil 430 decreases. Accordingly, it is possible for the power reception apparatus 400 to detect a foreign object from variations of the impedance using the impedance when there is no foreign object as a reference value.

Example of Configuration of Foreign Object Detection Section

Figure 5:
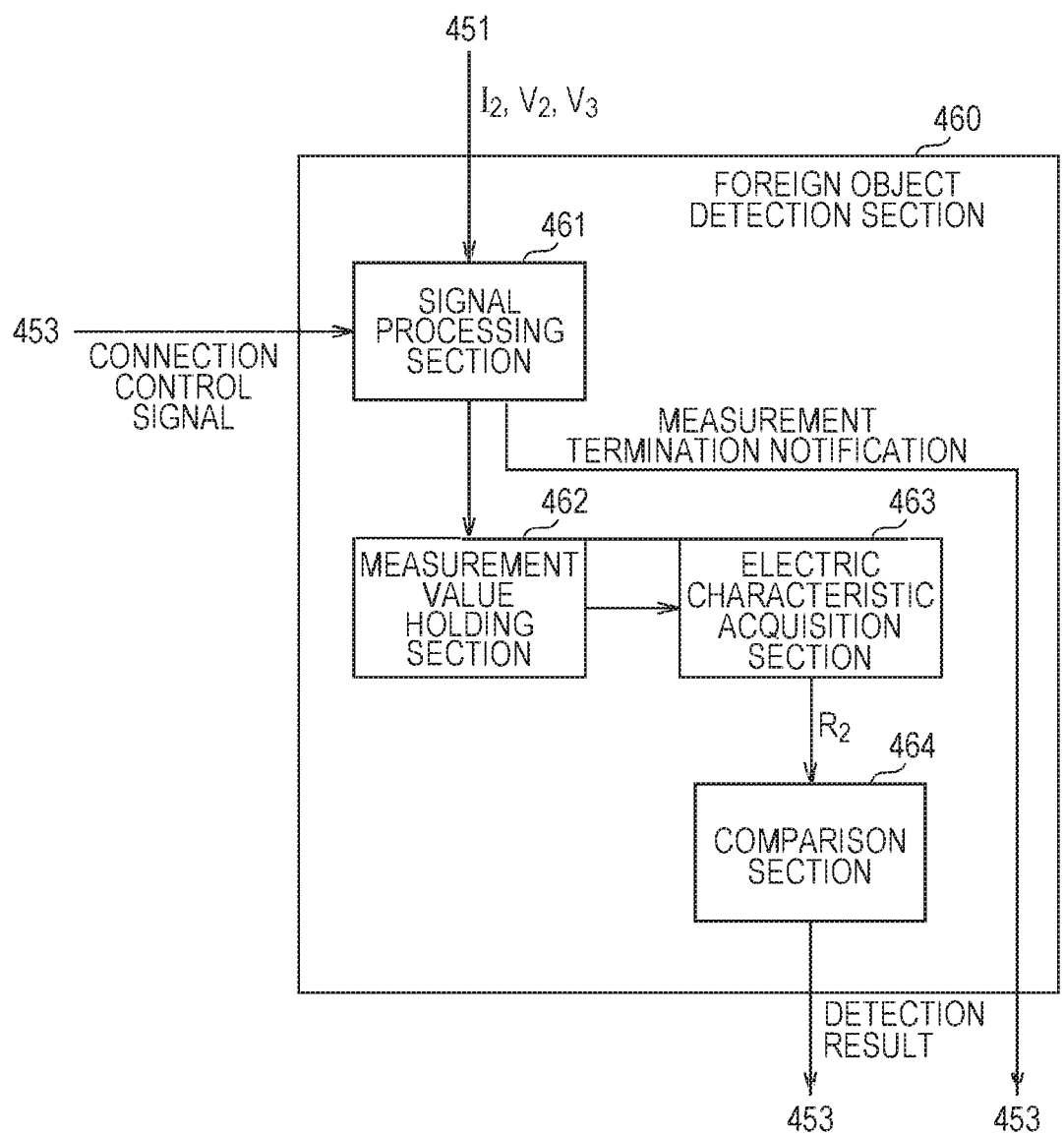
FIG. 5 is a block diagram illustrating an example of a configuration of a foreign object detection section according to the first embodiment.

FIG. 5 is a block diagram illustrating an example of a configuration of the foreign object detection section 460 according to the first embodiment. The foreign object detection section 460 includes a signal processing section 461, a measurement value holding section 462, an electric characteristic acquisition section 463, and a comparison section 464.

The signal processing section 461 performs predetermined signal processing on a measurement value. Specifically, separation of a real component and an imaginary component of the AC signal is performed as the signal processing. The signal processing section 461 causes the measurement value holding section 462 to hold the power reception coil current $I_{2off}$ when measured at load disconnection time. Also, the signal processing section 461 causes the measurement value holding section 462 to hold individual real components of the power reception coil voltage $V_{2off}$, and the detection coil voltage $V_{3off}$ when a load is disconnected. After the individual measurement values at load disconnected time are held, the signal processing section 461 generates a measurement termination notification, and supplies the measurement termination notification to the power reception control circuit 453.

And when a load is connected, the signal processing section 461 causes the measurement value holding section 462 to hold a power reception coil current $I_{2on}$ measured at that time. Also, the signal processing section 461 causes the measurement value holding section 462 to hold the real components of the power reception coil voltage $V_{2on}$, and the detection coil voltage $V_{3on}$ that were measured when a load is connected. The measurement value holding section 462 holds the measurement values.

In this regard, the signal processing section 461 may further perform processing for separating a fundamental wave component from higher harmonic wave components and noise component to extract only the fundamental component as signal processing. Also, the signal processing section 461 may further perform processing for obtaining information on the carrier frequency, and information on the duty ratio of the carrier wave, and notifying the information to the power reception control circuit 453, and the like. Also, in the case of a configuration in which the measurement section 451 measures a DC voltage, and the like, it is not necessary for the signal processing section 461 to separate the real component and the imaginary component.

The electric characteristic acquisition section 463 obtains parameters indicating an electric characteristic of at least one of the power reception coil 430 and the detection coil 410 from the measurement values. The electric characteristic acquisition section 463 obtains the impedance of the power reception coil 430 of an equivalent circuit as a parameter, for example. Specifically, the electric characteristic acquisition section 463 reads power reception coil currents $I_{2on}$ and $I_{2off}$, power reception coil voltages $V_{2on}$ and $V_{2off}$, and detection coil voltages $V_{3on}$ and $V_{3off}$ from the measurement value holding section 462. And the electric characteristic acquisition section 463 obtains a resistor R2 as impedance of the power reception coil 430 from those measurement values using the following expressions 1 to 4. The electric characteristic acquisition section 463 supplies the obtained resistor R2 to the comparison section 464.

$$R_2 \approx \frac{\Delta K}{I_{2on}/\text{real}(V_{3on}) - I_{2off}/\text{real}(V_{3off})} \quad \text{[Expression 1]}$$

$$\Delta K = K_{off} - K_{on} \quad \text{[Expression 2]}$$

$$K_{off} = \frac{\text{real}(V_{2off})}{\text{real}(V_{3off})} \quad \text{[Expression 3]}$$

$$K_{on} = \frac{\text{real}(V_{2on})}{\text{real}(V_{3on})} \quad \text{[Expression 4]}$$

Here, Expression 1 is derived from $(R_2+R_{on}) \times I_{2on} \cong \text{real}(V_{2on})$ and $(R_2+R_{off}) \times I_{2off} \cong \text{real}(V_{2off})$. In these expressions, $R_{on}$ is a real part of the impedance of the circuit that is substantially connected to the power reception coil 430 when a load is connected, and $R_{off}$ is a real part of the impedance of the circuit load that is substantially connected to the power reception coil 430 when a load is disconnected. Also, in Expression 1, Expression 3, and Expression 4, real(A) is a function that returns a real component of A.

In this regard, in Expression 3 and Expression 4, a ratio of the real components is obtained. However, a ratio of the imaginary components or a ratio of the absolute values may be obtained in place of the real components.

Also, the electric characteristic acquisition section 463 obtains the resistor $R_2$ as the impedance of the power reception coil 430. However, the reactance of the power reception coil 430 may be obtained in place of the resistor.

The comparison section 464 compares the parameter obtained by the electric characteristic acquisition section 463 with an upper limit threshold value, and a lower limit threshold value. Here, the upper limit threshold value is set to a higher value than the reference value using a parameter value when there is no foreign object as a reference value. Also, the lower limit threshold value is set to a lower value than the reference value. If the parameter is higher than the upper limit threshold value, or the parameter is lower than the lower limit threshold value, the comparison section 464 detects a foreign object. The comparison section 464 supplies the detection result of the foreign object to the power reception control circuit 453.

In this regard, the foreign object detection section 460 obtains individual measurement values of the amount of power supply when a load is connected, and the amount of power supply when a load is disconnected. However, the present disclosure is not limited to this configuration. For example, two different amounts of power may be supplied in sequence while the power reception apparatus 400 is connected to a load, or disconnected to a load, and the foreign object detection section 460 may obtain measurement values in sequence at the time of those amounts of power supply. In this case, the load connection circuit 457 is not necessary for the power reception apparatus 400 for the measurement. However, it is desirable to dispose the load connection circuit 457 in the power reception apparatus 400 from the viewpoint of operation and safety.

Operation Example of Power Supply Apparatus

Figure 6:
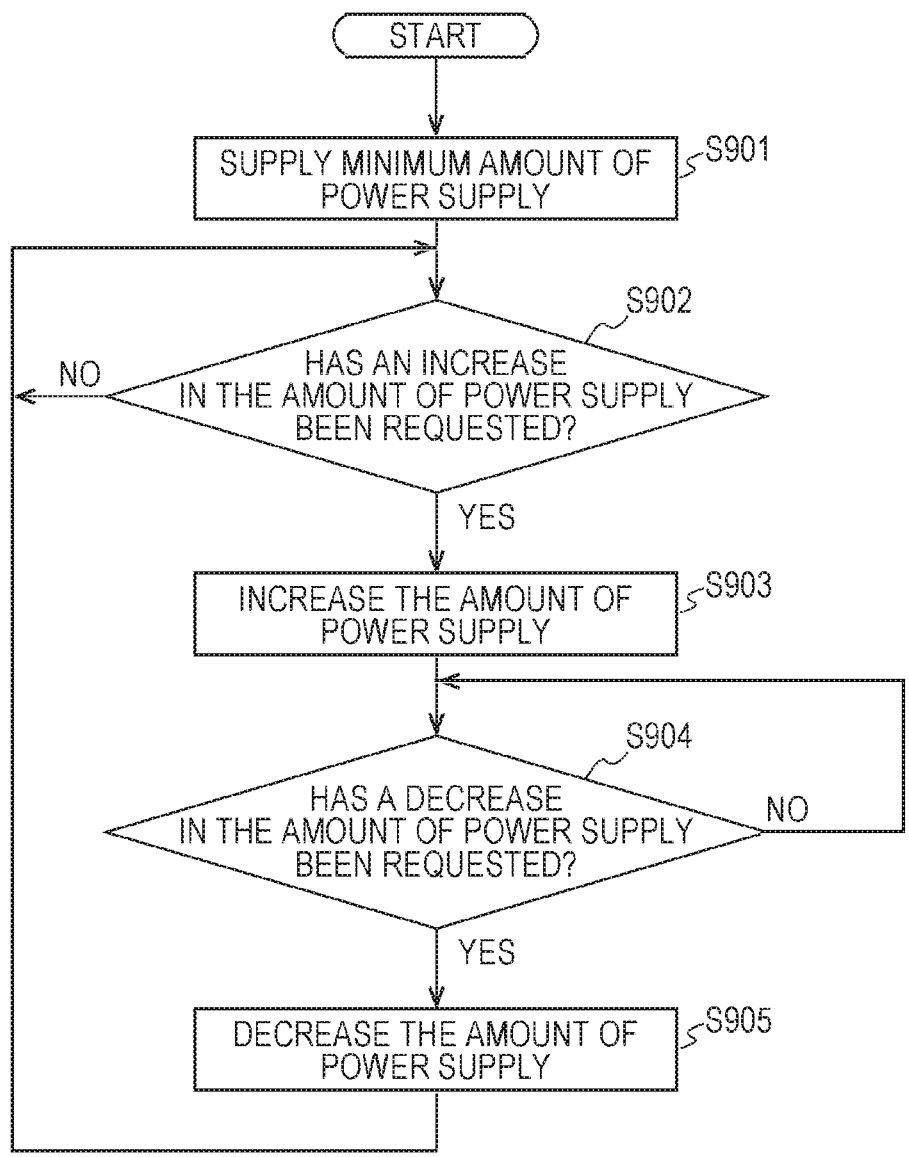
FIG. 6 is a flowchart illustrating an example of operation of the power supply apparatus according to the first embodiment.

FIG. 6 is a flowchart illustrating an example of operation of the power supply apparatus 100 according to the first embodiment. This operation is started when an external power source is turned on to the power supply apparatus 100, for example. The power supply apparatus 100 supplies a minimum amount of power W1 through a magnetic field (step S901).

And the power supply apparatus 100 determines whether an increase in the amount of power supply has been requested or not by the power supply control signal (step S902). If an increase in the amount of power supply has not been requested (step S902: No), the processing of the power supply apparatus 100 returns to step S902.

If an increase in the amount of power supply has been requested (step S902: Yes), the power supply apparatus 100 increases the amount of power supply to W2 (step S903). And the power supply apparatus 100 determines whether a decrease in the amount of power supply has been requested or not by the power supply control signal (step S904). If a decrease in the amount of power supply has not been requested (step S904: No), the processing of the power supply apparatus 100 returns to step S904.

If a decrease in the amount of power supply has been requested (step S904: Yes), the power supply apparatus 100 decreases the amount of power supply to W1 (step S905), and the processing returns to step S902.

Operation Example of Power Reception Apparatus

Figure 7:
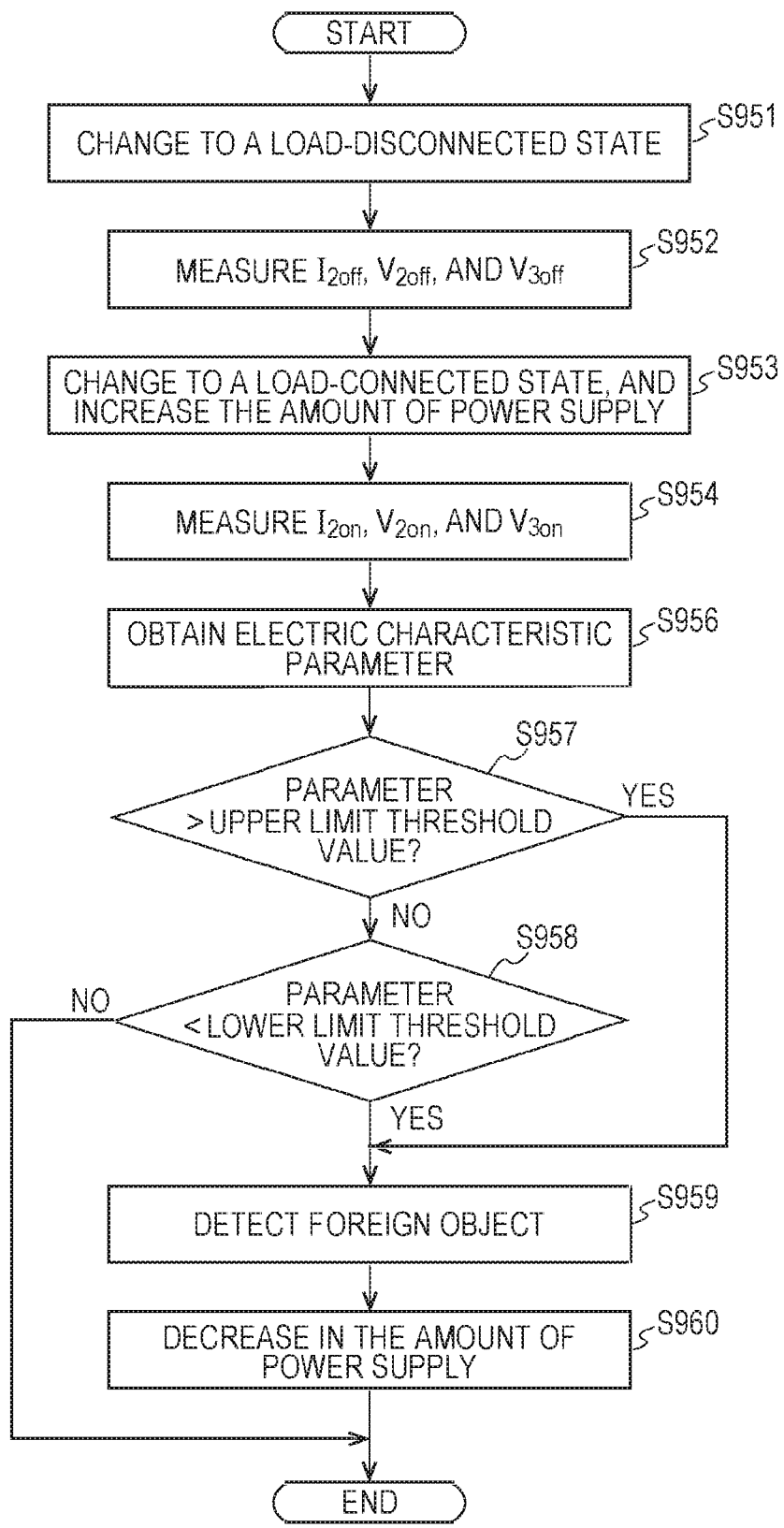
FIG. 7 is a flowchart illustrating an example of operation of the power reception apparatus according to the first embodiment.

FIG. 7 is a flowchart illustrating an example of operation of the power reception apparatus 400 according to the first embodiment. This operation is started when power is supplied from the power supply apparatus 100, for example. The power reception apparatus 400 goes to a load disconnected state by the connection control signal (step S951). The power reception apparatus 400 measures the power reception coil current $I_{2off}$, the power reception coil voltage $V_{2off}$, and the detection coil voltage $V_{3off}$ (step S952).

And the power reception apparatus 400 goes to a load-connected state by the connection control signal to increase the amount of power supply by the power supply control signal (step S953). The power reception apparatus 400 measures the power reception coil current $I_{2on}$, the power reception coil voltage $V_{2on}$, and the detection coil voltage $V_{3on}$ (step S954). The power reception apparatus 400 obtains the parameter of the electric characteristic from the measurement values using Expression 1, and the like (step S956). The power reception apparatus 400 determines whether the parameter is higher than the upper limit threshold value or not (step S957).

If the parameter is not higher than the upper limit threshold value (step S957: No), the power reception apparatus 400 determines whether the parameter is lower than the lower limit threshold value (step S958). If the parameter is higher than the upper limit threshold value (step S957: Yes), or the parameter is lower than the lower limit threshold value (step S958: Yes), the power reception apparatus 400 detects a foreign object (step S959). And the power reception apparatus 400 decreases the amount of power supply by the power supply control signal (step S960). If the parameter is higher than the lower limit threshold value (step S958: No), or after step S960, the power reception apparatus 400 terminates the operation for detecting a foreign object.

In this regard, the power reception apparatus 400 performs the detection processing illustrated in FIG. 7 only once at power reception time. However, this detection processing may be performed on a regular basis.

Figure 8:
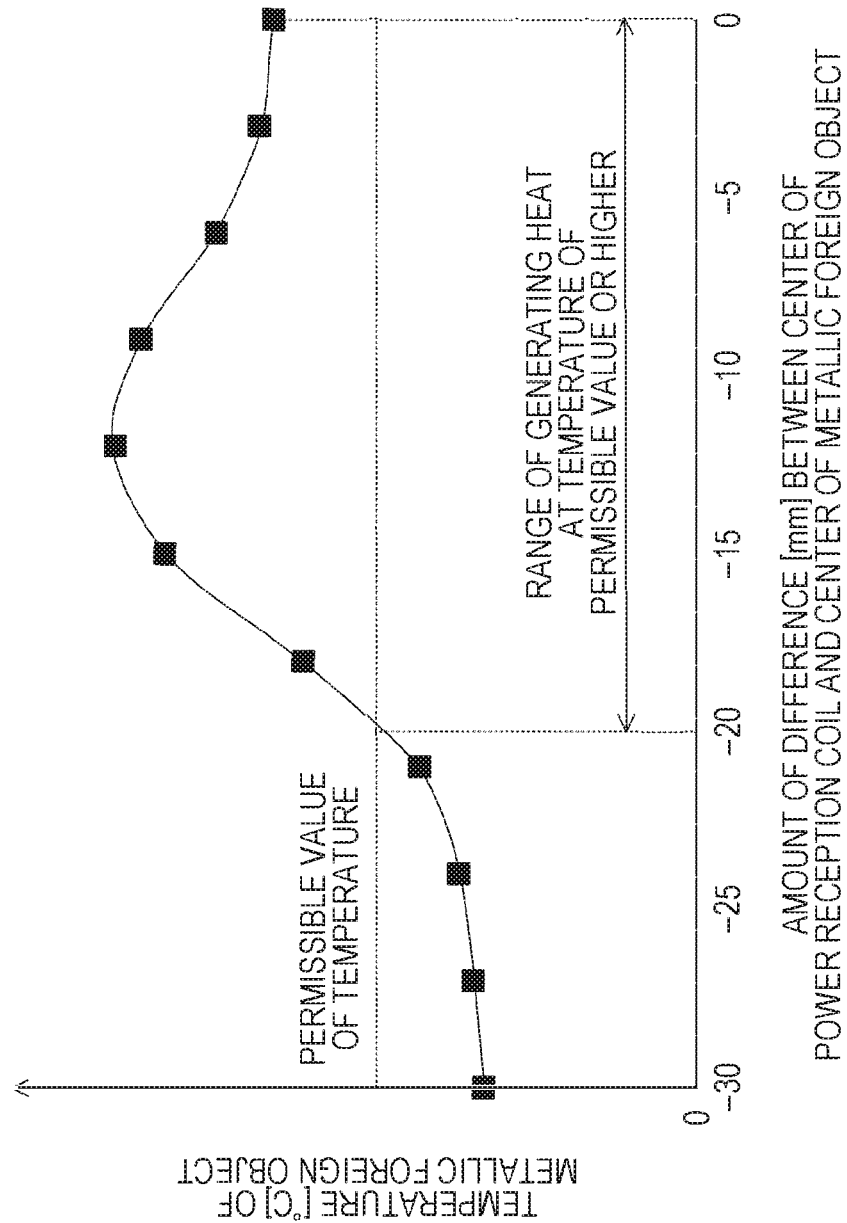
FIG. 8 is a graph illustrating an example of a temperature change of a foreign object according to the first embodiment.

FIG. 8 is a graph illustrating an example of temperature change of a foreign object according to the first embodiment. The vertical axis in FIG. 8 represents temperature of a metallic foreign object generated heat by lines of magnetic force from the power supply apparatus 100. The horizontal axis represents the amount of difference between the center of the foreign object and the center of the power reception coil 430. The unit of temperature is ° C., for example. The unit of the amount of difference is millimeter (mm). It is assumed that the wire of the power reception coil 430 is disposed at a position within approximately −13 mm from the center of the power reception coil 430. The temperature of the foreign object increases as the amount of difference goes from −30 mm to come close to 0 mm, and becomes highest at a distance of about −13 mm. Also, the temperature is lower than the peak in the case where the amount of difference is 0 mm, but becomes a temperature higher than that at −30 mm. Accordingly, it is understood that when there is a foreign object inside the power reception coil 430, the temperature of the foreign object becomes relatively high. Thus, for example, the power reception apparatus 400 is designed such that a permissible value of a temperature at which the power reception apparatus 400 is not damaged is determined, and a range that is higher than the temperature and in which the foreign object generates heat (from −20 mm to 0 mm, or the like) is assumed to be a range of detecting a foreign object in order to detect a foreign object in the detection range.

Figure 9:
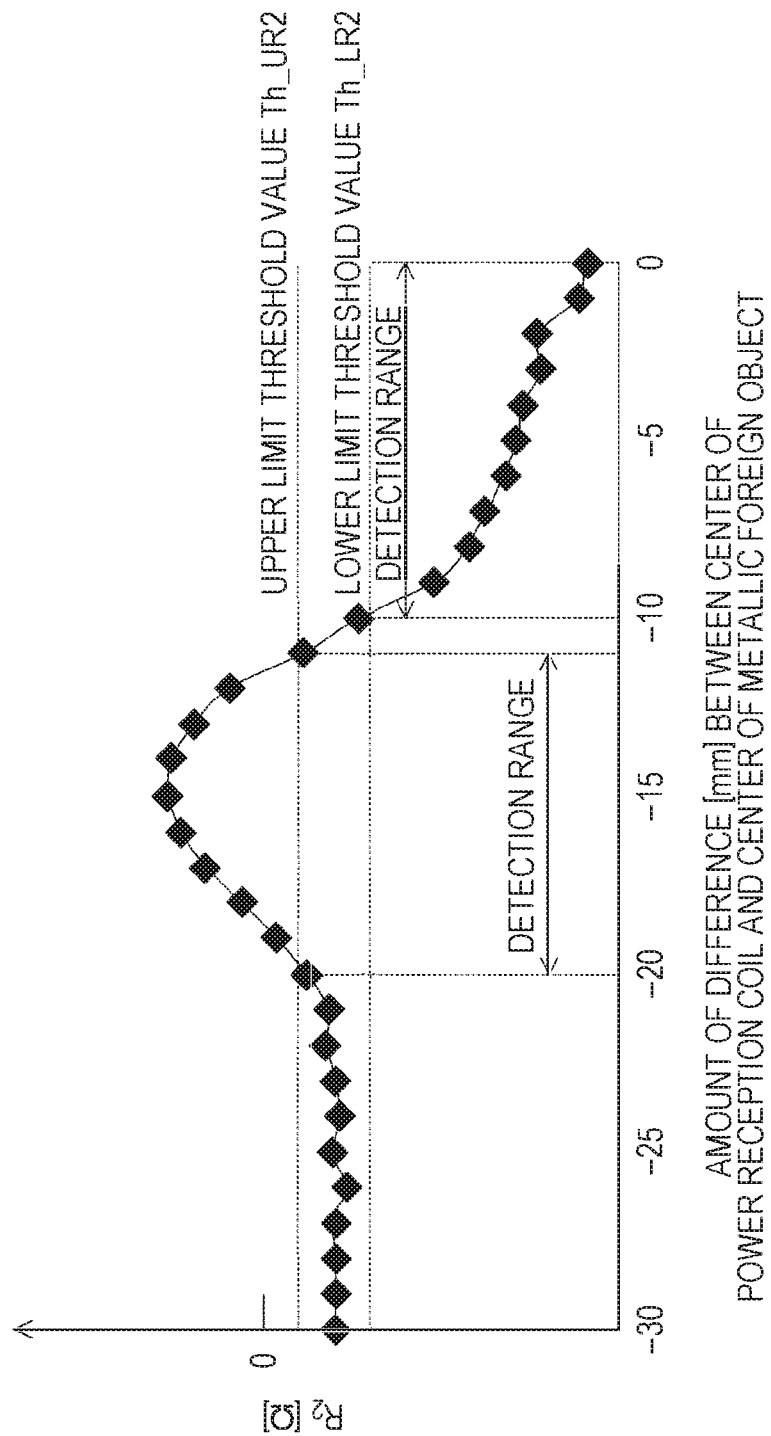
FIG. 9 is a graph illustrating an example of an impedance change of the power reception coil according to the first embodiment.

FIG. 9 is a graph illustrating an example of impedance change of the power reception coil 430 according to the first embodiment. The vertical axis in FIG. 9 represents impedance of the power reception coil 430, and the horizontal axis represents the amount of difference between the center of a foreign object and the center of the power reception coil 430. In FIG. 9, it is assumed that the measuring conditions, such as the size and the material of the foreign object, the amount of power supply, and the like are the same as those of FIG. 8.

As illustrated in FIG. 9, the impedance of the power reception coil 430 becomes higher than the reference value in the vicinity of the track of the power reception coil, and becomes lower than the reference value in the vicinity of the center. Accordingly, by setting an upper limit threshold value Th_UR2, which is higher than the reference value, and a lower limit threshold value Th_LR2, which is lower than the reference value, to suitable values, it is possible for the power reception apparatus 400 to correctly detect a foreign object in the vicinity of the track at which the foreign object generates heat at a temperature higher than the permissible value, or in the vicinity of the center.

In this manner, by the first embodiment of the present technique, the power reception apparatus detects a foreign object in the case where the impedance is lower than the lower limit threshold value, and thus is allowed to detect the foreign object in the vicinity of the center of the power reception coil 430 with high precision. Also, the power reception apparatus detects a foreign object in the case where the impedance is higher than the upper limit threshold value, and thus is allowed to detect the foreign object in the vicinity of the track of the power reception coil 430 with high precision.

2. Second Embodiment

In the first embodiment, the power reception apparatus 400 detects a foreign object from the impedance of the power reception coil 430. However, it is possible to detect a foreign object from ΔK. The power reception apparatus 400 according to the second embodiment is different from the first embodiment in the point that a foreign object is detected from ΔK.

The measurement section 451 according to the second embodiment does not measure the power reception coil current $I_2$. Accordingly, in the measurement section 451, an ammeter, or the like becomes unnecessary.

Also, the foreign object detection section 460 according to the second embodiment obtains ΔK using Expression 2 to Expression 4, and detects a foreign object by comparing ΔK thereof and the threshold value.

Figure 10:
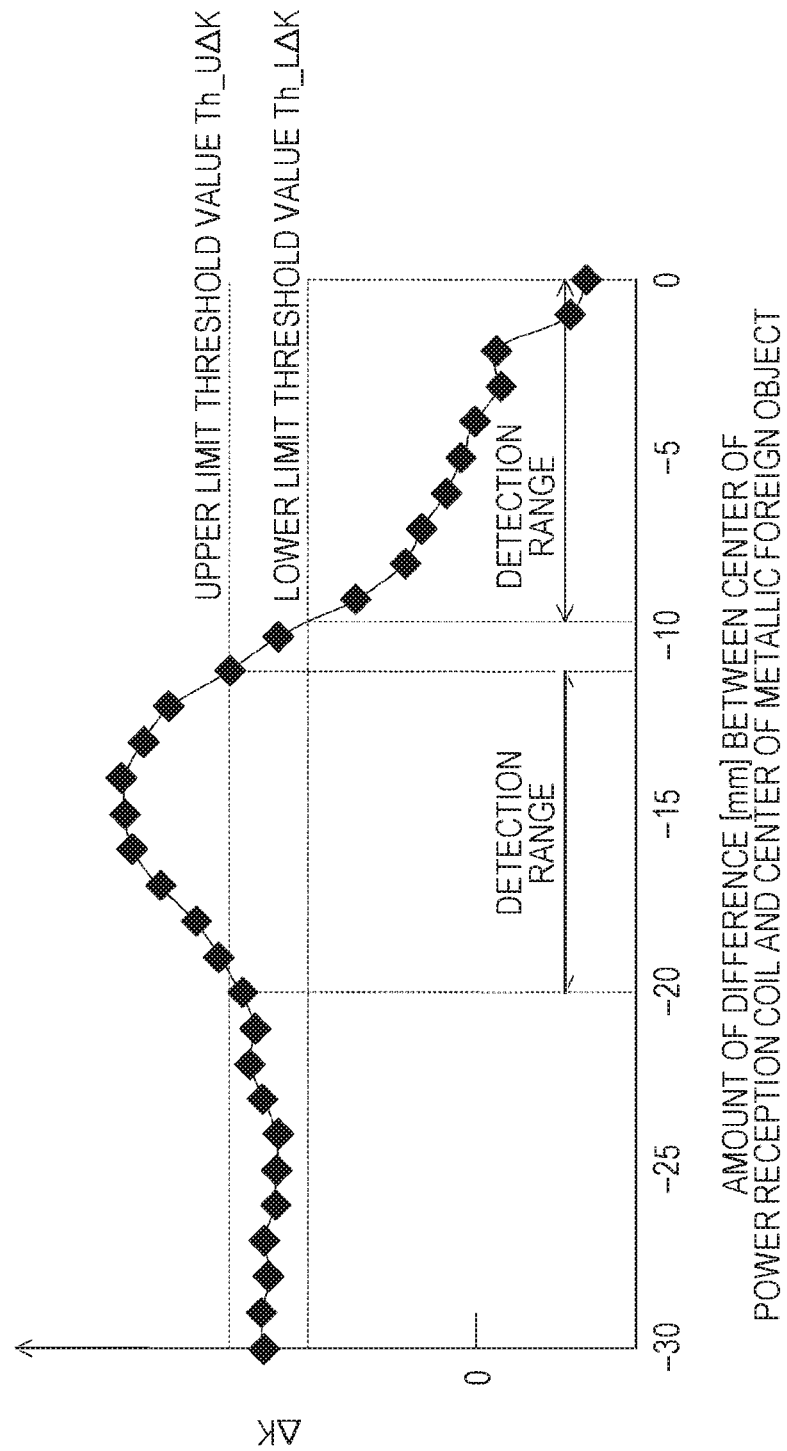
FIG. 10 is a graph illustrating an example of a change in AK according to a second embodiment.

FIG. 10 is a graph illustrating an example of change of ΔK according to the second embodiment. The vertical axis in FIG. 10 represents ΔK, and the horizontal axis represents the amount of difference between the center of the foreign object and the center of the power reception coil 430. In FIG. 10, it is assumed that the measuring conditions, such as the size and the material of the foreign object, the amount of power supply, and the like are the same as those of FIG. 8.

As illustrated in FIG. 10, ΔK of the power reception coil 430 becomes higher than the reference value in the vicinity of the track of the power reception coil, and becomes lower than the reference value in the vicinity of the center. Accordingly, by setting an upper limit threshold value Th_UΔK, which is higher than the reference value, and a lower limit threshold value Th_LΔK, which is lower than the reference value to suitable values, it is possible for the power reception apparatus 400 to correctly detect a foreign object in the vicinity of the track at which the foreign object generates heat at a temperature higher than the permissible value, or in the vicinity of the center.

In this manner, by the second embodiment, it is possible to correctly detect a foreign object on the basis of ΔK.

3. Third Embodiment

In the first embodiment, the power reception apparatus 400 detects a foreign object from the impedance of the power reception coil 430. However, it is possible to detect a foreign object from a voltage ratio between the power reception coil 430 and the detection coil 410. The power reception apparatus 400 according to the third embodiment is different from the first embodiment in the point that a foreign object is detected the voltage ratio.

The measurement section 451 according to the third embodiment does not measure the power reception coil current $I_2$. Accordingly, in the measurement section 451, an ammeter, or the like becomes unnecessary. Also, the measurement section 451 does not measure the power reception coil voltage $V_{2off}$ and the detection coil voltage $V_{3off}$ when a load is disconnected. These measurements become unnecessary, and thus the latency from a measurement start of the measurement value to a detection end of a foreign object becomes short.

Also, the foreign object detection section 460 according to the third embodiment obtains the voltage ratio using Expression 4, and detects a foreign object by comparing the voltage ratio and the threshold value.

Figure 11:
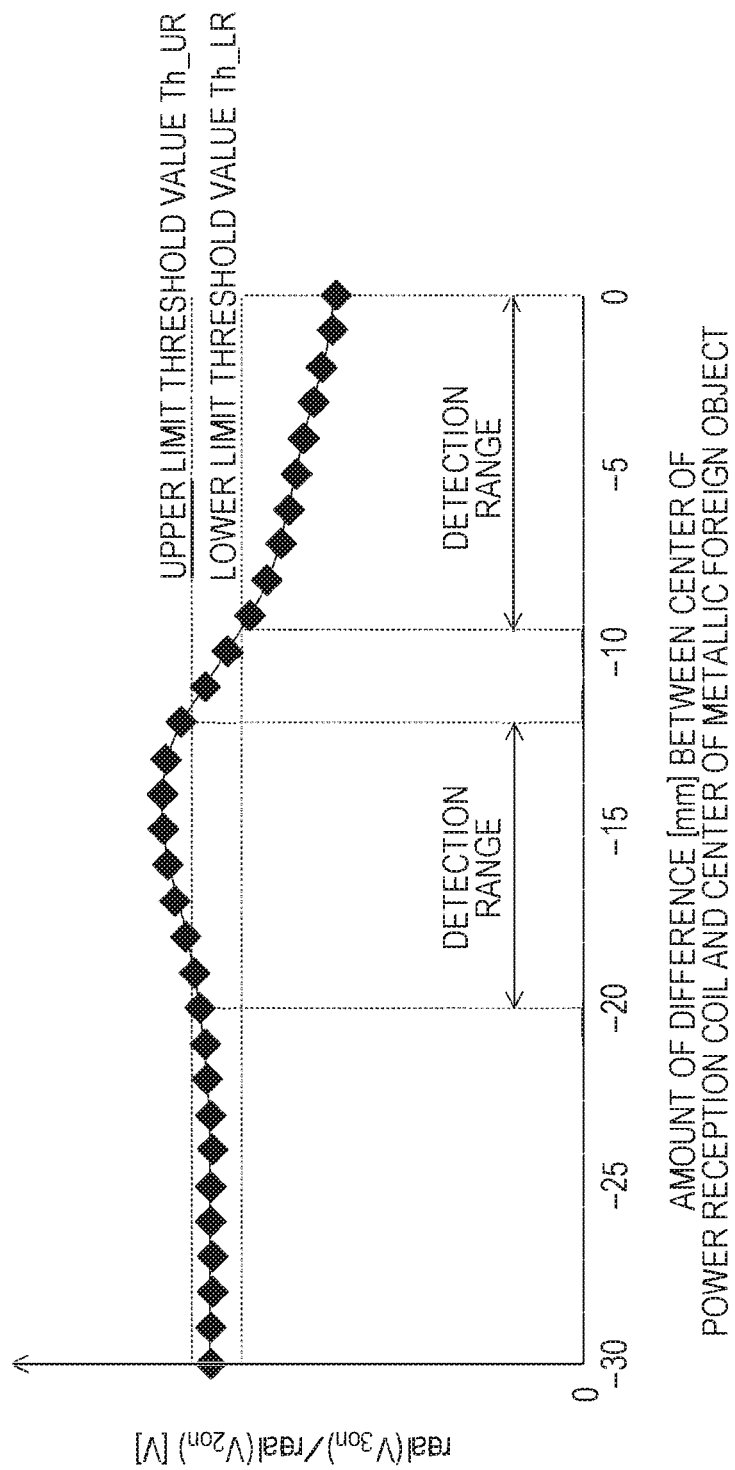
FIG. 11 is a graph illustrating an example of a change in voltage ratio according to a third embodiment.

FIG. 11 is a graph illustrating an example of change of the voltage ratio according to the third embodiment. The vertical axis in FIG. 11 represents the voltage ratio obtained from Expression 4. The horizontal axis represents the amount of difference between the center of a foreign object and the center of the power reception coil 430. In FIG. 11, it is assumed that the measuring conditions, such as the size and the material of the foreign object, the amount of power supply, and the like are the same as those of FIG. 8.

As illustrated in FIG. 11, the voltage ratio of the power reception coil 430 becomes higher than the reference value in the vicinity of the track of the power reception coil, and becomes lower than the reference value in the vicinity of the center. Accordingly, by setting an upper limit threshold value Th_UR, which is higher than the reference value, and a lower limit threshold value Th_LR, which is lower than the reference value to suitable values, it is possible for the power reception apparatus 400 to correctly detect a foreign object in the vicinity of the track at which the foreign object generates heat at a temperature higher than the permissible value, or in the vicinity of the center.

In this manner, by the third embodiment, it is possible to correctly detect a foreign object on the basis of the voltage ratio.

4. Fourth Embodiment

In the first embodiment, the power reception apparatus 400 detects a foreign object from the impedance of the power reception coil 430. However, it is possible to detect a foreign object from a detection coil voltage. The power reception apparatus 400 according to the fourth embodiment is different from the first embodiment in the point that a foreign object is detected by the detection coil voltage $V_{3on}$.

The measurement section 451 according to the fourth embodiment measures only the detection coil voltage $V_{3on}$. Also, the voltage and the current of the power reception coil ought not to be measured, and thus the configuration of the measurement section 451 becomes simple.

Also, the foreign object detection section 460 according to the fourth embodiment compares the real component of the detection coil voltage $V_{3on}$ and the threshold value in order to detect a foreign object.

In this regard, the foreign object detection section 460 detects a foreign object by the real component of the detection coil voltage $V_{3on}$. However, the present technique is not limited to this configuration. For example, the foreign object detection section 460 may detect a foreign object by the imaginary component of the detection coil voltage $V_{3on}$ or the absolute value of the detection coil voltage $V_{3on}$.

Figure 12:
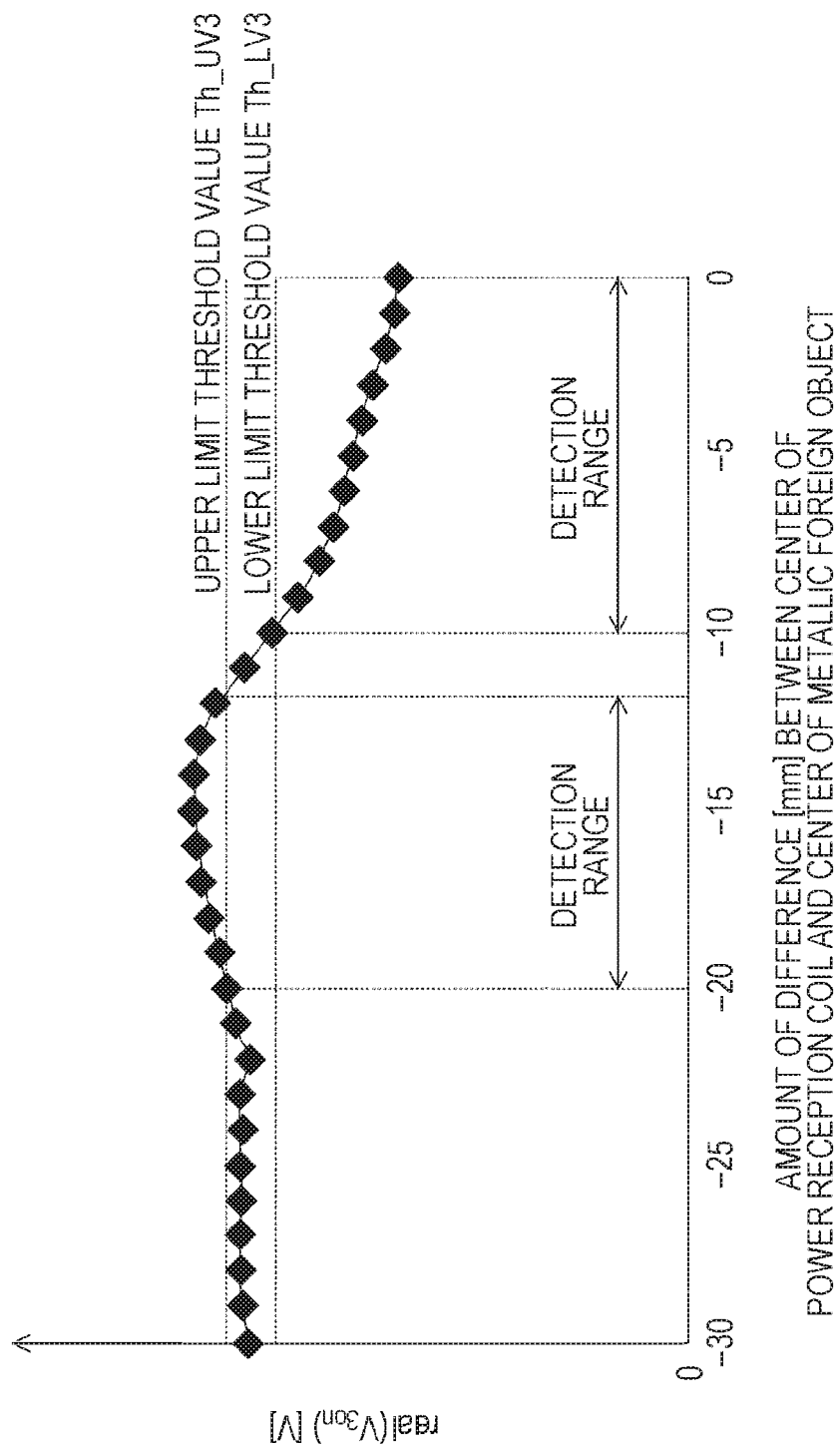
FIG. 12 is a graph illustrating an example of a voltage change of a detection coil according to a fourth embodiment.

FIG. 12 is a graph illustrating an example of change of the detection coil voltage $V_{3on}$ according to the fourth embodiment. The vertical axis in FIG. 12 represents the real component of the detection coil voltage $V_{3on}$, and the horizontal axis represents the amount of difference between the center of a foreign object and the center of the power reception coil 430. In FIG. 12, it is assumed that the measuring conditions, such as the size and the material of the foreign object, the amount of power supply, and the like are the same as those of FIG. 8.

As illustrated in FIG. 12, the detection coil voltage $V_{3on}$ of the power reception coil 430 becomes higher than the reference value in the vicinity of the track of the power reception coil, and becomes lower than the reference value in the vicinity of the center. Accordingly, by setting an upper limit threshold value Th_UV3, which is higher than the reference value, and a lower limit threshold value Th_LV3, which is lower than the reference value to suitable values, it is possible for the power reception apparatus 400 to correctly detect a foreign object in the vicinity of the track at which the foreign object generates heat at a temperature higher than the permissible value, or in the vicinity of the center.

In this manner, by the fourth embodiment, it is possible to correctly detect a foreign object on the basis of the detection coil voltage.

Variations

In the first embodiment, the detection coil 410 is disposed with the layout exemplified in FIGS. 4A and 4B. However, the detection coil 410 may be disposed with a layout different from that in FIGS. 4A and 4B. The power reception apparatus 400 according to a variation is different from the first embodiment in the point that the disposition of the detection coil 410 is different from that in FIGS. 4A and 4B.

FIGS. 13A to 13G are sectional views illustrating examples of disposition of a power reception coil and a detection coil according to variations, respectively.

Figure 13A:
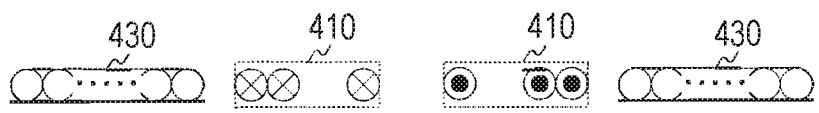
FIGS. 13A to 13G are sectional views illustrating examples of disposition of a power reception coil and a detection coil according to variations, respectively.
Figure 13B:
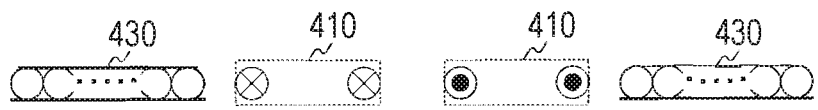

FIG. 13A is an example in which a part of wire of the detection coil 410 is provided with a gap. In FIG. 13B, the number of turns of the detection coil 410 is decreased from that in FIG. 13A.

Figure 13C:
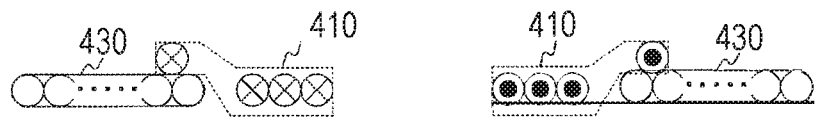

FIG. 13C is an example in which the outermost edge of the detection coil 410 is disposed on the track of the power reception coil 430.

Figure 13D:

FIG. 13D is an example in which the center of the detection coil 410 is shifted from the center of the power reception coil 430 such that one of both ends of the detection coil 410 is disposed on the track of the power reception coil 430, and the other end is disposed outside the power reception coil 430.

Figure 13E:
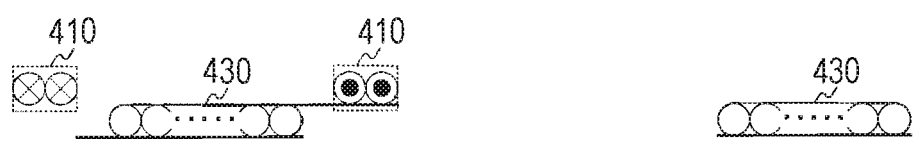

FIG. 13E is an example in which the center of the detection coil 410 is positioned over the track of the power reception coil 430.

Figure 13F:

FIG. 13F is an example in which the center of the detection coil 410 is shifted from the center of the power reception coil 430 such that one of both ends of the detection coil 410 is disposed on the track of the power reception coil 430, and the other end is disposed inside the power reception coil 430.

Figure 13G:
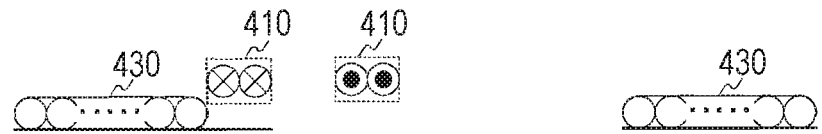
Figure 14:
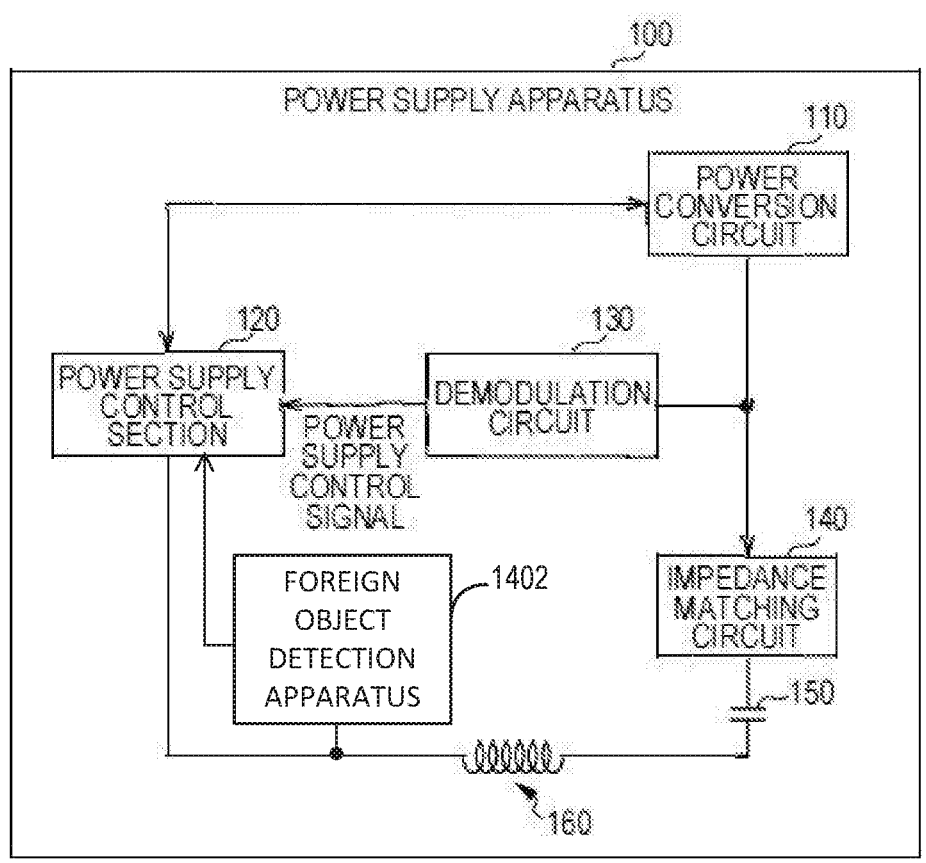
FIG. 14 is a block diagram illustrating an example of a foreign object detection apparatus disposed inside of a power supply apparatus according to the first embodiment.
Figure 15:
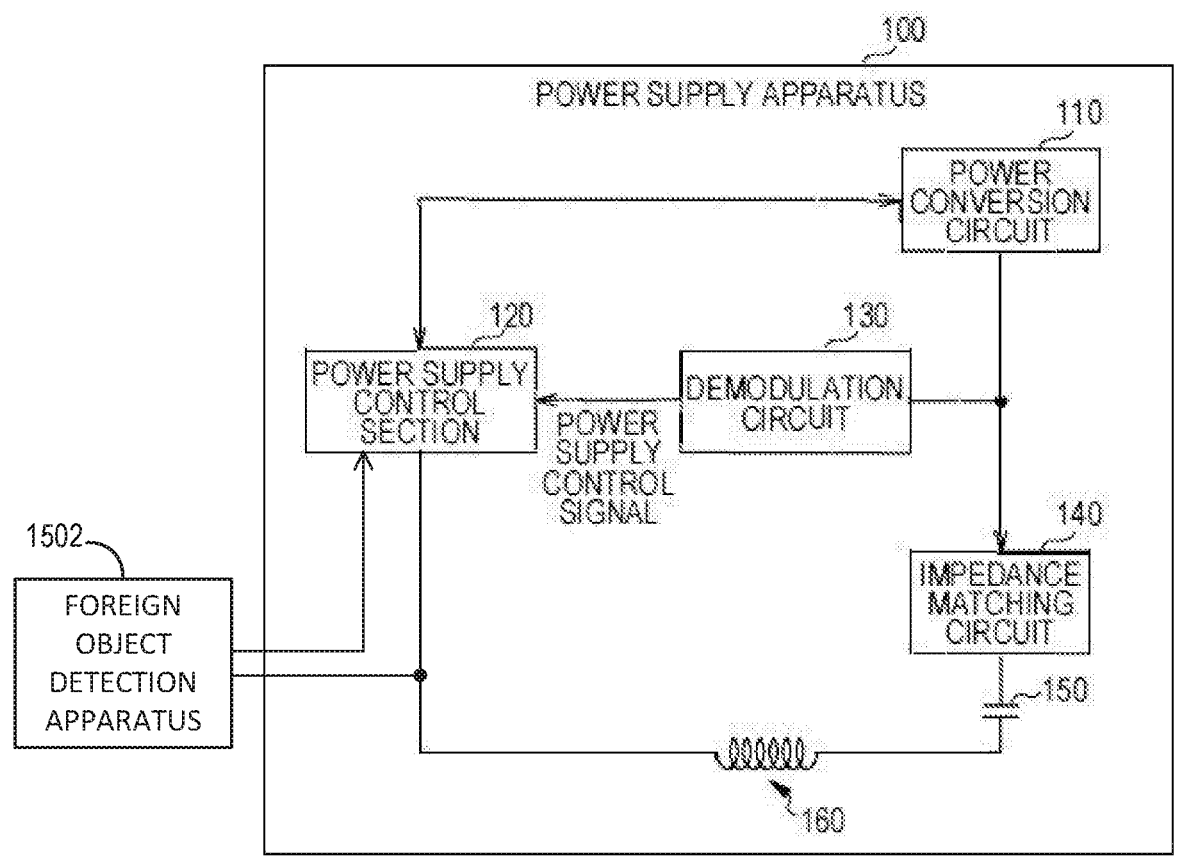
FIG. 15 is a block diagram illustrating an example of a foreign object detection apparatus disposed outside of a power supply apparatus according to the first embodiment.

FIG. 13G is an example in which the center of the detection coil 410 is shifted from the center of the power reception coil 430 in a range where the detection coil 410 is positioned inside the power reception coil 430.

In this regard, the above-described embodiments are examples of realizing the present technique. There are corresponding relationships between the matters in the embodiments and the matters specifying the disclosure in the claims, respectively. In the same manner, there are corresponding relationships between the matters specifying the disclosure in the claims and the matters having the same names in the embodiments of the present technique, respectively. However, the present technique is not limited to the above-described embodiments. It is possible to achieve the present technique by making various changes on the embodiments without departing from the gist of the present technique.

Also, the processing procedure described in the above embodiments may be understood as methods that include a series of the processing procedure. Also, the processing procedure may be understood as a program that causes a computer to perform the series of the processing procedure or a recording medium for storing the program. It is possible to use, as the recording medium, a CD (Compact Disc), an MD (MiniDisc), a DVD (Digital Versatile Disc), a memory card, a Blu-ray (registered trademark) disc, and the like, for example.

In this regard, it is also possible to configure the present technique as follows.

(1) A detection apparatus including:
a measurement coil disposed in a vicinity of a power reception coil configured to receive power supplied through a magnetic field;
a measurement section configured to measure a voltage of the measurement coil as a measurement coil voltage; and
a foreign object detection section configured to obtain an electrical characteristic value of at least one of the power reception coil and the measurement coil on the basis of the measurement coil voltage, and to detect a foreign object in the magnetic field if the electrical characteristic value is lower than a predetermined lower limit threshold value.

(2) The detection apparatus according to (1),
wherein if the electrical characteristic value is lower than the lower limit threshold value, or if the electrical characteristic value is higher than an upper limit threshold value greater than the lower limit threshold value, the foreign object detection section is configured to detect the foreign object.

(3) The detection apparatus according to (2),
wherein the upper limit threshold value is higher than a reference value being the electrical characteristic value when there is no foreign object, and the lower limit threshold value is a lower value than the reference value.

(4) The detection apparatus according to (1) or (2),
wherein the measurement section is configured to further measure a voltage and a current of the power reception coil, and
the foreign object detection section is configured to obtain impedance of the power reception coil from the measurement coil voltage, and the voltage and the current of the power reception coil as the electrical characteristic value.

(5) The detection apparatus according to any one of (1) to (4),
wherein the measurement section is configured to further measure a voltage of the power reception coil as a power reception coil voltage, and
the foreign object detection section is configured to obtain a voltage ratio of the measurement coil voltage and the power reception coil voltage as the electrical characteristic value.

(6) The detection apparatus according to any one of (1) to (5),
wherein the measurement section is configured to further measure a voltage of the power reception coil as a power reception coil voltage,
the power reception coil is configured to receive first and second power having a different amount of power with each other in sequence, and
the foreign object detection section is configured to obtain, as the electrical characteristic, a difference between the voltage ratio obtained when the first power is received, and the voltage ratio obtained when the second power is received.

(7) The detection apparatus according to any one of (1) to (6),
wherein the measurement coil is configured to have a smaller coil surface area than that of the power reception coil.

(8) The detection apparatus according to (7),
wherein the measurement coil is disposed inside the power reception coil.

(9) The detection apparatus according to any one of (1) to (8),
wherein the measurement coil is disposed on a substantially same plane as that of the power reception coil.

(10) The detection apparatus according to any one of (1) to (9),
wherein the measurement coil is disposed at a position where a coil surface of the measurement coil and that of the power reception coil have a substantially same center position.

(11) The detection apparatus according to any one of (1) to (10),
wherein the power is power supplied from a power supply apparatus, and
the detection apparatus further including a transmission section configured to transmit a control signal requesting a decrease in an amount of the power if the foreign object is detected.

(12) A detection apparatus including:
a measurement coil disposed in a vicinity of a power supply coil configured to supply power through a magnetic field;
a measurement section configured to measure a voltage of the measurement coil as a measurement coil voltage; and
a foreign object detection section configured to obtain an electrical characteristic value of at least one of the power reception coil and the measurement coil on the basis of the measurement coil voltage, and to detect a foreign object in the magnetic field if the electrical characteristic value is lower than a predetermined lower limit threshold value.

(13) A power supply system including:
a power supply coil configured to supply power through a magnetic field;
a power reception coil configured to receive the power;
a measurement coil disposed in a vicinity of the power reception coil;
a measurement section configured to measure a voltage of the measurement coil as a measurement coil voltage; and
a foreign object detection section configured to obtain an electrical characteristic value of at least one of the power reception coil and the measurement coil on the basis of the measurement coil voltage, and to detect a foreign object in the magnetic field if the electrical characteristic value is lower than a predetermined lower limit threshold value.

(14) A method of controlling a detection apparatus, the method including:
measuring by a measurement section, as a measurement coil voltage, a voltage of a measurement coil disposed in a vicinity of a power reception coil configured to receive power supplied through a magnetic field; and
detecting a foreign object by a foreign object detection section obtaining an electrical characteristic value of at least one of the power reception coil and the measurement coil on the basis of the measurement coil voltage, and detecting the foreign object in the magnetic field if the electrical characteristic value is lower than a predetermined lower limit threshold value.

What is claimed is:

1. A power supply device comprising:
a power supply control section configured to control an amount of power wirelessly supplied from a power supply coil to a power reception coil of a power reception apparatus through a magnetic field;
a measurement section configured to measure a power supply coil voltage of the power supply coil; and
a foreign object detection section configured to
obtain an electrical characteristic value of the power supply coil based on the power supply coil voltage, and
detect a presence or an absence of a foreign object in the magnetic field based on the electrical characteristic value and a predetermined threshold value,
wherein a first amount of power is supplied from the power supply coil to the power reception coil when the measurement section measures the power supply coil voltage, and
wherein a second amount of power is supplied from the power supply coil to the power reception coil when the foreign object detection section detects the absence of the foreign object in the magnetic field, the second amount of power is higher than the first amount of power.

2. The power supply device according to claim 1, wherein the foreign object detection section is further configured to set the predetermined threshold value based on a reference value that is the electrical characteristic value indicating the absence of the foreign object in the magnetic field.

3. The power supply device according to claim 2, wherein the predetermined threshold value is lower than the reference value.

4. The power supply device according to claim 1, wherein the measurement section is further configured to measure a potential difference between two ends of the power supply coil as the power supply coil voltage.

5. The power supply device according to claim 1, wherein the foreign object detection section is configured to detect the foreign object in the magnetic field when the electrical characteristic value is lower than the predetermined threshold value.

6. The power supply device according to claim 1, wherein the power supply control section is further configured to control the amount of power to the power reception coil in accordance with a power supply control signal wirelessly received from the power reception apparatus.

7. A power supply apparatus comprising:
a power supply face having a certain area, a surface of the power supply face is configured to be placed a power reception apparatus;
a resonance circuit including a capacitor and a power supply coil, the power supply coil is arranged to a lower part or the surface of the power supply face;
a power supply control section configured to control an amount of power wirelessly supplied from the power supply coil to a power reception coil of the power reception apparatus through a magnetic field;
a measurement section configured to measure a power supply coil voltage of the power supply coil; and
a foreign object detection section configured to
obtain an electrical characteristic value of the power supply coil based on the power supply coil voltage, and
detect a presence or an absence of a foreign object in the magnetic field based on the electrical characteristic value and a predetermined threshold value,
wherein a first amount of power is supplied from the power supply coil to the power reception coil when the measurement section measures the power supply coil voltage, and
wherein a second amount of power is supplied from the power supply coil to the power reception coil when the foreign object detection section detects the absence of the foreign object in the magnetic field, the second amount of power is higher than the first amount of power.

8. The power supply apparatus according to claim 7, wherein the foreign object detection section is configured to detect the foreign object in the magnetic field when the electrical characteristic value is lower than the predetermined threshold value.

9. The power supply apparatus according to claim 7, wherein the foreign object detection section is further configured to set the predetermined threshold value based on a reference value that is the electrical characteristic value indicating the absence of the foreign object in the magnetic field.

10. The power supply apparatus according to claim 9, wherein the predetermined threshold value is lower than the reference value.

11. The power supply apparatus according to claim 7, wherein the measurement section is further configured to measure a potential difference between two ends of the power supply coil as the power supply coil voltage.

12. The power supply apparatus according to claim 7, wherein the power supply control section is further configured to control the amount of power to the power reception coil in accordance with a power supply control signal wirelessly received from the power reception apparatus.

* * * * *